US008786932B2

(12) United States Patent (10) Patent No.: US 8,786,932 B2
Copeland et al. (45) Date of Patent: Jul. 22, 2014

(54) ADVANCED ELECTRODE STRUCTURES AND ELECTROCHROMIC DEVICES

(75) Inventors: Gavin Copeland, Dublin (IE); Alain Briancon, Poolesville, MD (US); Martin Moeller, Stockholm (SE); Nigel Leyland, Dublin (IE); Chris Giacoponello, Pottstown, PA (US); Micheal Cassidy, Dublin (IE); Christian Grave, Dublin (IE); David Corr, Dublin (IE); David Bevk, Novo Mesto (SI); Michael Ryan, Dublin (IE)

(73) Assignees: Ntera, Inc., Radnor, PA (US); Ntera Limited (IE)

( * ) Notice: Subject to any disclaimer, the term of this patent is extended or adjusted under 35 U.S.C. 154(b) by 419 days.

(21) Appl. No.: 13/203,146

(22) PCT Filed: Feb. 24, 2010

(86) PCT No.: PCT/US2010/025149
§ 371 (c)(1),
(2), (4) Date: Oct. 12, 2011

(87) PCT Pub. No.: WO2010/099147
PCT Pub. Date: Sep. 2, 2010

(65) Prior Publication Data
US 2012/0038967 A1 Feb. 16, 2012

Related U.S. Application Data

(60) Provisional application No. 61/155,014, filed on Feb. 24, 2009, provisional application No. 61/209,052, filed on Mar. 3, 2009.

(51) Int. Cl.
*G02F 1/155* (2006.01)
*G02F 1/15* (2006.01)
*G09G 3/38* (2006.01)

(52) U.S. Cl.
CPC .............. *G02F 1/1523* (2013.01); *G02F 1/155* (2013.01); *G02F 1/1525* (2013.01); *G02F 1/15* (2013.01); *G09G 3/38* (2013.01)
USPC .......................... 359/269; 359/265; 345/105

(58) Field of Classification Search
CPC .......... G02B 26/00; G02B 5/02; G02F 1/361; G02F 1/00; G02F 1/15; G02F 1/153; G02F 1/01; G02F 1/03
USPC ......... 359/265–275, 277, 245–247, 254, 242, 359/296; 349/182–186; 250/70; 345/49, 345/105, 76–77, 81, 85, 107; 348/814, 817; 252/582, 583, 600; 438/929
See application file for complete search history.

(56) References Cited

U.S. PATENT DOCUMENTS

2003/0227663 A1* 12/2003 Agrawal et al. ............... 359/265
2007/0097482 A1* 5/2007 Park et al. ..................... 359/273

OTHER PUBLICATIONS

International Preliminary Report on Patentability for PCT/US2010/025149 dated Aug. 30, 2011, 7 pages.

(Continued)

*Primary Examiner* — Dawayne A Pinkney
(74) *Attorney, Agent, or Firm* — Morgan, Lewis & Bockius LLP

(57) ABSTRACT

The present invention provides for a display device and a method to manufacture the display device. The display device includes: a transparent layer; a coloring electrode; a separator; a second electrode; an electrolyte permeating throughout the display device; and a back layer positioned on the back side of the display. The transparent layer, which has a top surface and a bottom surface, is positioned at the viewer side of the display. The coloring electrode is positioned on the transparent layer bottom surface and includes: a connected conductor system formed from one or more heterogeneous conductive layers and a coloring layer, with the proviso that the heterogeneous conductive layers are not positioned between the transparent layer bottom surface and the coloring layer. The conductor heterogeneity includes variations in one or more of: conductor material composition; conductor layer dimension; conductor layer pattern; conductor layer grid design, and combinations thereof. The separator layer is positioned between the coloring electrode and the second electrode.

26 Claims, 20 Drawing Sheets

(56) References Cited

OTHER PUBLICATIONS

International Search Report for PCT/US2010/025149 dated May 19, 2010, 3 pages.

Publication of PCT/US2010/025149 dated Sep. 2, 2010, 82 pages.

The Written Opinion for PCT/US2010/025149 dated May 19, 2010, 6 pages.

* cited by examiner

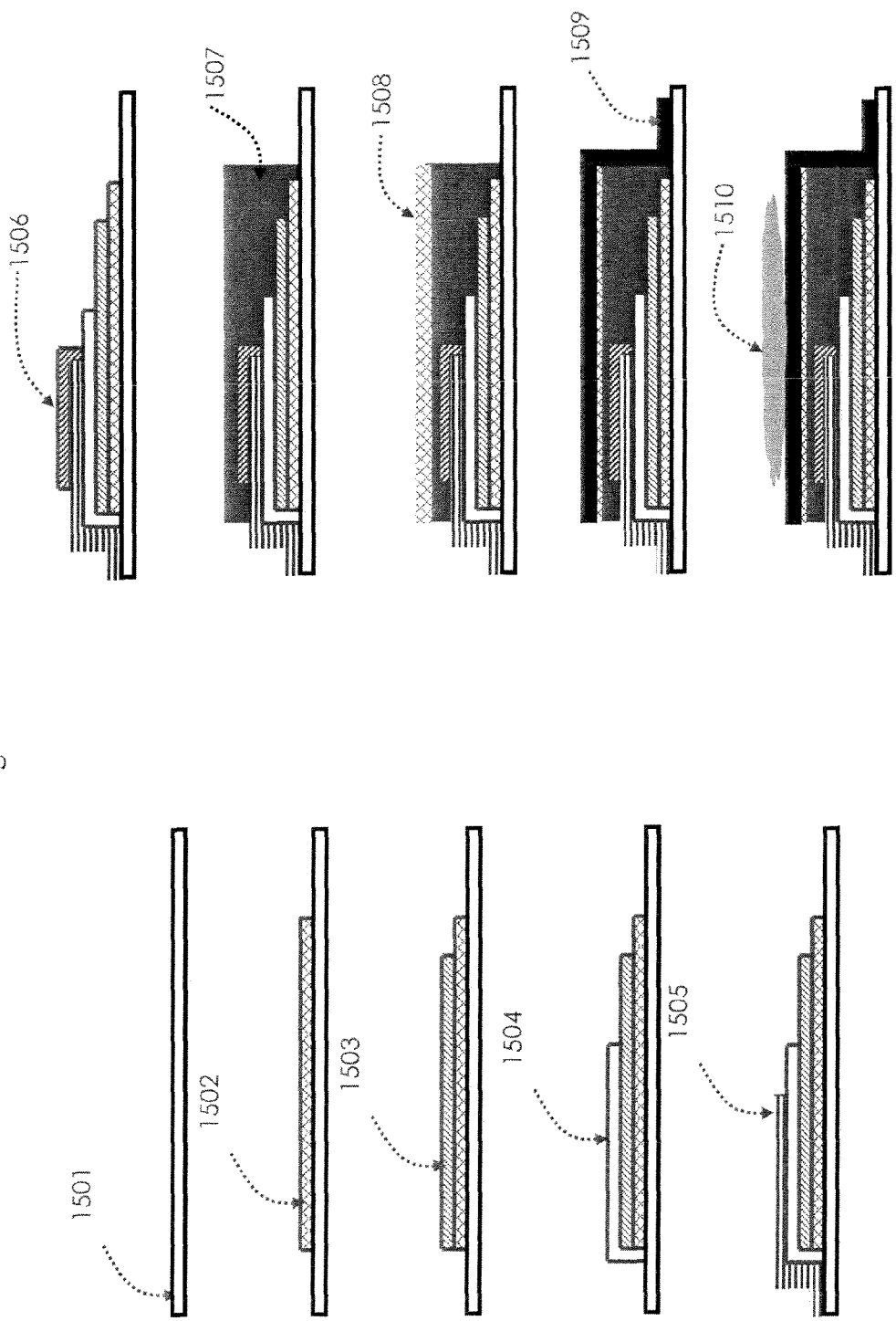

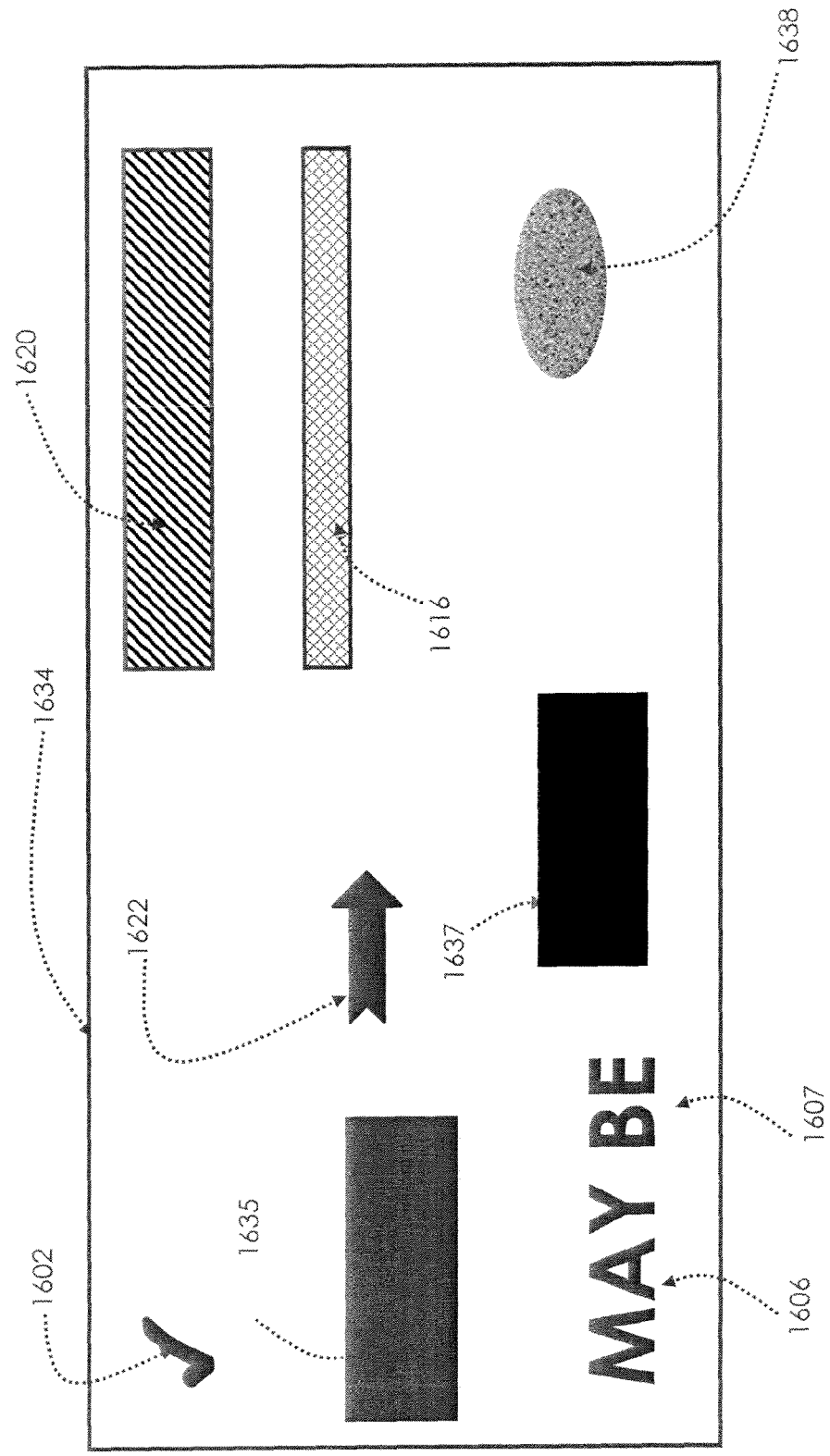

ADVANCED ELECTRODE STRUCTURES AND ELECTROCHROMIC DEVICES

CROSS REFERENCE TO RELATED APPLICATION

This application is a U.S. National Stage of and claims priority benefit from International Patent Application No. PCT/US2010/025149, filed 24 Feb. 2010, now published as WO 2010/099147A1, which in turn claims priority benefit from U.S. Provisional Patent Application No. 61/155,014, filed 24 Feb. 2009, and U.S. Provisional Patent Application No. 61/209,052, filed 3 Mar. 2009, all of which are incorporated herein by reference in their entirety.

FIELD OF THE INVENTION

The present invention relates to electrochromic display devices, a method of manufacturing such devices and applications of the devices.

BACKGROUND OF THE INVENTION

Much research effort has been made into producing electronic paper as an electronic medium. Electronic paper requires the following characteristics: being reflective rather than emissive; high white (or off white) reflectivity and contrast ratio; allowing high definition images; memory effect (referred to at times as bistability); low-voltage drive capability; slimness; lightness; and low cost. In particular, electronic paper is required to have as excellent white reflectivity and contrast ratio as paper with respect to its display characteristics, and the development of a display device offering all of these characteristics is far from easy. The rapid advancements in printed electronics allow for the creation of low cost special purpose smart devices integrating sensing, logic, communication, storage/memory, and electro-optic effects into a new breed of functional media. To be effective as a display technology for functional media, a display must ideally be constructed using an all print process (that is a purely additive process), be readily conformable to various shapes such as toys or consumer electronics devices, survive hot lamination for smart cards and stored value cards applications. For applications such as smart packaging, the substrate used to create this electronic medium is the package itself (that is, not an appliqué) and the manufacturing process must as aligned with graphic printing technology (e.g. screen printing, flexography, gravure, inkjet). This means that designs can be realized based on real life precision, registration, and accuracy of printing equipment. It is highly desirable that this electronic medium must be met with a minimal impact on picture quality. Quality of the reflectance, hues of colors during coloring, hues of colors over time, color matching, switching speed for both coloring and bleaching must as good as possible. The requirements must also not restrict the type of devices that be created. One must also ensure that large devices, devices with large icons and segments and multi-color devices can be created.

Most display (whether reflective, emissive, or trans-reflective) technologies rely on a field effect to generate a change in the image. This field effect has to impact the entire color changing structure associated with the color changing elements. The color changing elements are often referred to as the coloring changing plane, or the front plane (even if not in the front of the display). The field generation system is often referred to as the backplane even though it might not be solely placed in the back of the display device. The field(s) generated can be used to generate the image (mostly in emissive displays where energy is constantly used to emit light) or to change the image (mostly in reflective displays). This architecture is applied to the different types of Cathode Ray, LCD, LED, OLED, electrophoretic, electro-wetting. Part of this front plane architecture has to thus be transparent (or nearly transparent) to ensure the user sees the color changes of the color changing plane. It is also the structure adopted by solar cell systems.

Displays/Systems based on chromic effects stand in sharp contrast with these traditional displays in that they do not require a field effect to change the color and thus are not constrained by this field encapsulation requirement of non-chromic displays. Some of the key chromic effects known are as follows:

Photochromism—color change caused by light;
Thermochromism—color change caused by heat;
Tribochromism—color change caused by mechanical friction;
Piezochromism—color change caused by mechanical pressure;
Solvatochromism—color change caused by solvent polarity;
Halochromism—color change caused by a change in pH. (See Vincent et al U.S. Pat. No. 6,879,424, Vincent and Flick U.S. Pat. No. 7,054,050 as a reference);
Electrochromism—color change caused by electrical charge;
Ionochromism—color change caused by ions (some ionochromic systems are at times referred to as electrochromic even though the change in color is created by the insertion or the extraction of cations/anions rather than the redox effect of adding or removing electrons.

Among those, only electrochromic system rely on the presence of charges and thus on the need to conduct and direct charges to a part of the core color changes. Compound devices can be created, of course, where an electrical system is used to trigger another effect, but they are combination devices such as Tatsuura et all in U.S. Pat. No. 7,463,400.

Legacy Architectures for Electrochromic Systems

Electrochromism has been used for mirrors, windows, light modulator and display/electronics paper systems (see P. M. S Monk, R. J. Mortimer, and D. R. Rosseinsky, Electrochromism and Electrochomic Devices, ISBN 978-0-521-82269-5, 2007).

Regardless of the class of devices, three architectures have been traditionally introduced. These are:

1) A sandwich architecture is discussed by Fitzmaurice et al U.S. Pat. No. 6,301,038 where two substrates are used. It also introduces the concept of high surface area nanoporous electrochromic films. An advanced design supporting reflective and emissive designs using a sandwich architecture is disclosed in Mizuno et al U.S. Pat. No. 7,184,191 where the working side has two electrodes, one that emits light, one that reflect light. The substrates used are covered with transparent conductors.

2) Pichot et al in U.S. Pat. No. 7,460,289, introduced a monolith (single substrate) structure where a single substrate is used. The counter electrode (aka COM electrode for common) is printed first on the substrate, then the separator, then the working electrode. The working electrode has a single non-patterned conductor buried in its structure. Improvement on this concept has been developed by Leyland et al in Patent Application PCT/US2008/065062. This architecture is referred to as COM on substrate.

3) Another single substrate monolith architecture, referred to as SEG on substrate (as in segmented electrode relating to the area of the working electrode that changes color through the redox process) is described in Briancon et al, PCT/

US2009/056162. In this application, a conductor is applied directly between the substrate supporting the working (typically segmented, thus SEG) SEG electrode, and the SEG electrode.

A fourth type of architecture was recently disclosed in PCT/US2009/056162 In this invention, a porous substrate is used inside the structure itself, because it is porous, electrolyte permeates through it. While developed for displays applications, nothing precludes it from being used for the other classes of devices, once a porous substrate can be made transparent. This architecture is referred to as substrate as SEP (for separator).

Regardless of the specific cell architecture, there are common limitations related to the design of the working (SEG) electrode of electrochromic (and ionochromic) systems. Those limitations come, among matters, from the selection and use of conductors inside the working electrode, namely uniform near transparent conductors, as well as requirements on manufacturing that are not aligned with the most effective manufacturing techniques available for printed electronics. The current invention resolves these limitations by focusing the control of electron and ion motions through the working electrode and performing this control in a manner that is invisible to an end user of the system.

Transparent conductors used in the industry are generally in the form of indium tin oxide ($In_{2\square x}Sn_xO_3$ or ITO), fluorine doped tin oxide (FTO) and doped zinc oxide (Aluminium doped Zinc Oxide). ITO has a yellow tint. Transparent semiconductors, such as Indium Gallium Zinc Oxide, can also be used. Transparent conductors tend to break down due to fatigue. ITO is known to show degradation with time when subject to mechanical stresses (see Wen-Fa Wu and Bi-Shiou Chiouy, "Mechanical and optical properties of ITO films with anti-reflective and anti-wear coatings" in Applied Surface Science, Vol. 115, Issue 1 May 1997, Pages 96-102.) This is a serious limitation for items such a smart labels or credit cards as these items are often bent during use. Dealing with this limitation is not an issue when dealing with television and computer displays, but it is for printed electronics. The current invention resolves this problem by enabling materials other than ITO to be used for many designs as well when using ITO, hiding the effect of the cracks to the end user of the systems.

Conductive Polymers can also be used as a transparent conductor. Most of them are derivatives of polyacetylene, polyaniline, polypyrrole or polythiophene. The most prevalent are is poly(3,4-ethylenedioxythiophene) (PEDOT) or poly(3,4-ethylenedioxythiophene) poly(styrene sulfonate) PEDOT: PSS. It should be noted that PEDOT:PSS exhibits electrochromic behavior (see Berggren et al U.S. Patent application No. 2007/0076287 A1 for more details). This means that PEDOT:PSS has limitations with respect to color performance in electrochromic materials that rely on another material for color changes. More recently, Carbon Nanotubes (CNT) have been added as an option to electrochromic display, albeit with a degradation of close to 30% in transmissivity (see Hrautyunyan U.S. Patent No. Application 2006/0284538). This is a major limitation with respect to optical quality, namely reflectance and contrast ratio.

Grid structures have been proposed as a replacement for ITO. The basic idea is to print a grid of a material inherently more conductive than ITO with very fine lines (optimally invisible to the human eye). Materials used have included silver, copper. Grids are extensively used for touch screen applications (albeit printed on the outside of the display structure). The electrical vs. optical trade-off of such structures is driven by the fill factor of such a grid. Most grid-based technologies available are not able to achieve an appropriate performance between conductivity and transparency.

Grid structures are not readily amenable to support a poorly conductive SEG material as lateral conductivity might not be high enough to move charges across wires being printed, and they are not amenable to being printed using screen-printing, a method widely used in printed electronics.

In order to improve the image quality, in non-chromic designs and most electrochromic displays, the transparent conductor deposited on the inside of the front substrate is very thin. It is also uniform across the entire surface area. This is needed to avoid changing the color of the color emitting or reflective element behind the conductor and to not create visible artifacts. This has two major limitations: 1) it will inherently cause an optical loss and at times the addition of a tint to the working electrode and 2) it is not amenable to patterning. This approach has been used in Fitzmaurice et al U.S. Pat. No. 6,301,038 where a transparent conductor is used to bring charges to a porous film including a n-type redox chromophore attached to nanoparticles of anatase TiO2. It is also used in Fitzmaurice U.S. Pat. No. 7,358,358. Optical quality and control of switching are limitations of these designs. The current invention removes these limitations by optimizing the structure of the conductor.

For the sandwich architecture, Maricle and Giglia, U.S. Pat. No. 3,844,636, describes an electrochromic mirror relying on the Frank-Keldysh or Platt effect (see J. of Chem. Phys. 34, pp. 862-863, 1961). The conductor is a single uniform material deposited with a constant thickness across the minor. Mirrors have a strict requirement for uniformity of performance, and that precludes moving away from this basic requirement. This conductor must however be near transparent so reflection from the back electrode is adequate. It is important to notice that in this design, the homogeneous conductive layer is in direct contact with the electrolyte of the cell. This creates compatibility issues that preclude the selection of specific metal-electrolyte combinations. The current invention removes these limitations on material choices.

Bennett et al. describes an ionochromic window in U.S. Pat. No. 5,466,577. A slotted continuous layer is used behind an ionochromic layer. This architecture has several limitations. It requires a gap between the coloring electrode and the front substrate to allow ionically conductive electrolyte to contact the electrochromic layer to allow the ions to pass through the entire electrode in order to allow for ionic based coloring. The conductive nature of the electrode is thus not geared to the management of charge motion (in either two or three dimensions) as indeed the potential applied is used to create an electrical field, which in turn triggers the motion of the ions to create the ionochromic coloring effect. Windows have a strict requirement for uniformity of performance and that precludes moving away from this basic requirement Of course, the conductor must be transparent. It is important to notice that in these designs, the homogeneous conductive layer is in direct contact with the electrolyte of the cell. The current invention does not have these limitations.

A single conductor, which is not placed first in the field of vision, has been introduced for COM on Substrate by Pichot in U.S. Pat. No. 7,460,289. The conductor is an non-patterned layer consisting of a homogeneous porous material printed/deposited with a constant thickness across the display. It describes the conductive structure to be larger than the area to be displayed.

It has the limitation of not supporting conductive tracks inside the display, managing the coloring of multiple segments inside a single display. Because the chromic layer is disposed on a conductor, images will not only be visible when the chromic material is in the colored state, but also when it is in the non-colored state This effect, which is called ghosting, is due to even slight differences in hue between the (non-colored) chromic layer, which forms the positive of the image, and the conductor, which forms the negative (i.e. the background). It also requires very pure electrolyte to be used to ensure high bistability. The current invention does not have these limitations.

The trade-off between electrical and optical quality of the working electrode (coloring electrode) has been dominated in legacy designs by the need to have a continuous transparent conductor film that is transparent enough for a viewer to observe the image created by the electrochomic area. Such thin conductor films possess an inherently high resistance and because of that a reduced current handling capability. Putting the conductor layer inside the working electrode also allows for displays with faster switching time for the same reflectivity if properly designed.

Color enhancement is readily achieved in a display. The introduction of a diffuser film on the outside of a reflective display is known to improve the perception of brightness. Tinting substrate (when placed in front the display) can be used. It has the disadvantage of potentially not being scratch-free and can create some parallax issues with the rest of the displays. It has the disadvantage to not be as roll-to-roll manufacturing friendly and is subject to manufacturing and usage scratches.

A method of color enhancement is discussed by Leibowitz in U.S. Pat. No. 3,944,333 where the dielectric separator between electrodes is filled with pigments that obscure the counter electrode and improve the contrast of the working electrode. This design has limitations with respect to the formulation of the dielectric separator, most notably because it requires additional processing to avoid separation and lumping between pigments, contributing to shorter shelf life for the ink. The current invention introduces patterned color matching components inside the working electrode.

Another method of color enhancement is discussed in Morrison and Jacobson U.S. Pat. No. 6,580,545. There, a white layer is applied at the bottom counter electrode (the non viewing side) of a multi-stack structure consisting of three electrochromic displays. It is used to provide a base color to the display and is thus not patterned. It is similar in principal (back electrode) to the enhancement discussed in Jung et at U.S. Patent Application Publ. No. 2008/0304142. These two designs have the same limitations as other legacy designs with respect to selection of materials for the working electrode, separator or electrolytes. It is also not patterned and cannot be used for color matching.

There is a need for a class of graphic displays to have a display that does not reveal the image to be displayed to the human eye until the image is activated (for instance a lottery ticket with a WIN vs. LOSE message) This is in contrast with numeric (typically 7 segment displays) and alphanumeric (13 segment displays) where the user knows a-priori the set of message that can be displayed.

There is also a need for lifetime and operation color integrity over time. This is a critical element to manage for certain applications, such as sensors where the user compares the hue and intensity of a colored chromic layer against a reference (printed on the same substrate or a card).

There is also the need for a display structure that shows words such as NO POWER when no power is being applied. This has to be achieved using no power.

Heretofore, display designs required the pattern of the electrochromic material to match exactly the image being presented to the end user. (See Coleman U.S. Pat. Nos. 5,500,759 and 6,582,509. Brabec et al. PCT Application EP2005/056014 for typical examples). This limitation results in the need for precise alignment/registration of the printing of chromic layer material. When looking at printing displays and systems that include displays using screen-printing, the alignment that can be achieved using a web sheet process is typically +−50 um. In contrast, the registration achievable using a roll-to-roll process is a not lower than +−120 um. The resolution achievable with screen-printing is about 100 um. Based on these capabilities, printing the maximum precision chromic layer is problematic for a roll-to-roll process, especially if the chromic layer is deposited on a conductor layer that has varying thickness or variation in surface energy. Legacy designs exhibit another related significant implication for electrochromic systems where multiple areas of the display are independently addressable, such as the 7 segments of a 7 segments digit. FIG. 1 illustrates a single structural substrate printed electrochromic (often referred to as monolith architecture) display structure. It is based on the designs covered by U.S. Pat. No. 6,870,657. This monolith electrochromic display structure (120) is typical of prior art designs. It is viewed from the top of the display through the top substrate (101). This substrate 101 includes flexible material such as PET, PETG, PEN, thin glass, bendable glass, or any other transparent material. On this substrate (101), a transparent conductor material (metal, organic, semiconductor) layer (102) is deposited on at least a part of the inside of the display. The deposition may be performed using a multiple of means such as printing, sputtering, ion beam deposition, etc. On the bottom interface of layer (102), a layer (103) of chromic material is deposited. The layer (103) can be patterned or un-patterned. Together, the transparent conductor and active layer form the so-called working electrode (107). All or part of this working electrode will change color saturation or hue during operation. There can be a plurality of such electrodes in a single display. A separator layer (104), akin to the dielectric of batteries, is placed next to layer (103) covering its entire area to insulate the working electrode from the counter electrode structure (108). This layer (104) is an ion conductive typically electrically insulating layer. The counter electrode is composed of two layers: A reservoir layer (105) and a conductive layer (106). The area of the charge reservoir layer (105) fits within the area of the insulation layer (104). The bottom conductor layer (106) is deposited below the reservoir layer. It covers the entire area of the charge reservoir layer (105). This layer (105) can be patterned. The display is fed through two conductors, one (109) for the working electrode, the other (120) the counter electrode. These conductors can be in the form of wires or simply conductive tracks printed on a structure. A graphic layer (111) may be printed on the outside of the top substrate. Layers (103), (104), (105), and (106) are permeated by an ion carrier electrolyte.

The present invention addresses the problems of legacy displays as described below.

SUMMARY OF INVENTION

The present invention provides for a display device forming an image and has a viewer side and a back side. The display device includes: a transparent layer; a coloring electrode; a separator; a second electrode; an electrolyte permeating throughout the display device; and a back layer positioned on the back side of the display. The transparent layer, which has a top surface and a bottom surface, is positioned at the viewer side of the display. The coloring electrode is positioned on the transparent layer bottom surface and includes: a connected conductor system formed from one or more heterogeneous conductive layers and a coloring layer, with the proviso that the heterogeneous conductive layers are not positioned between the transparent layer bottom surface and the coloring layer. The conductor heterogeneity includes variations in one or more of: conductor material composition; conductor layer dimension; conductor layer pattern; conductor layer grid design, and combinations thereof. The separator layer is positioned between the coloring electrode and the second electrode.

In one embodiment, the heterogeneous conductor layers are non-transparent.

In another embodiment, the display device further includes a passivator layer and opacifier layer which are each ionically isolative and electronically isolative. In some embodiments, the opacifier layer is located beneath the transparent layer bottom surface and above one or more of the heterogeneous conductor layers. In some embodiments, the passivator layer is located beneath one or more of the heterogeneous conductor layers and above the separator layer. In one embodiment, each passivator layer and opacifier layer can be transparent, translucent or opaque. In another embodiment, each passivator layer and opacifier layer contains reflective material, light scattering material, fluorescent material, phosphorescent material and combinations thereof. In another such embodiment, the opacifier layer has a shape corresponding to a negative shape of the image.

In yet another embodiment, the display device includes a coloring layer, which contains at least one coloring composition which generates an on-color image, and an opacifier layer, which contains a material which generates negative color image, and where the on-color image and the negative color image are a color match.

In still yet another embodiment, the display device includes a coloring layer, which contains at least one coloring composition which generates an off-color image, and an opacifier layer, which contains a material which generates a negative color image, and where the off-color image and the negative color image are a color match.

In one embodiment, the display device includes a coloring layer containing a coloring composition which when reduced causes the coloring layer to display the on color image.

In one embodiment, the display device includes a coloring layer containing a coloring composition which when oxidation causes the coloring layer to display the on color image.

In one embodiment, the display device includes a single coloring layer having two or more individually addressable segments and such single coloring layer has an external shape corresponding to a positive shape of the image. In one such embodiment, each individually addressable segment is connected to an independent heterogeneous conductor layer which is connected to an independent conductor track. In one such embodiment, each independent conductor track has a charge injection point including: a lateral edge conductor charge injection point; a transverse edge conductor charge injection point; an active matrix; a via; and a mid-conductor layer charge injection point.

In yet another embodiment, the display device includes a first coloring layer which is located above a single heterogeneous conductor layer which is connected to a conductor track at a charge injection point including: a lateral edge conductor charge injection point; a transverse edge conductor charge injection point; and a mid-conductor layer charge injection point. In one such embodiment, the display device further includes a second coloring layer located lateral to the first coloring layer and located above the single heterogeneous conductor layer.

In yet another embodiment, the display device has the passivator layer located beneath one or more of the heterogeneous conductor layers and above the separator layer. In such an embodiment, a first portion of the passivator has a shape corresponding to a negative shape of the image, and a second portion of the passivator layer is located below the coloring layer.

In another embodiment, the display device includes a passivator layer incorporating a taggant or security identifier.

In still yet another embodiment, the display device includes a coloring layer having two or more pixels, wherein each pixel is connected a single heterogeneous conductor layer. In one such embodiment, the single heterogeneous conductor layer is connected to a single conductor track. In some embodiments, the conductor track has a charge injection point including: a lateral edge conductor charge injection point; a transverse edge conductor charge injection point; an active matrix; a via; and a mid-conductor layer charge injection point. One such embodiment further includes charge injection points co-located with one or more coloring layers with the proviso that the one or more charge injection points are not located on a lateral side of the display.

In yet another embodiment, the display device of the present invitation includes a coloring layer containing one or more redox active materials that generates color upon reduction, a second redox active material that generates color upon oxidation and combinations thereof. In one such embodiment, the coloring layer contains a coloring composition having a first $E_{1/2}$ reduction potential ranging from −0.37 to −0.65 volts. In another such embodiment, the coloring layer contains a coloring composition having a first $E_{1/2}$ oxidation potential ranging from 0.8 to 1.2 volts.

In yet another embodiment, the display device includes one or more heterogeneous conductor layers that realize one or more diode or transistors.

The present invention further provides for a method to manufacture a display device. The method includes the steps of: printing a coloring electrode onto the transparent film; printing a separator layer onto the coloring electrode; printing a second electrode onto the separator layer; printing an electrolyte solution; and printing a back layer to thereby form the back side of the display device.

In one embodiment, the method further includes the steps of: printing the coloring layer onto the transparent film bottom surface in a positive image shape; printing an opacifier layer onto the transparent film bottom surface wherein the opacifier layer is printed in a negative image shape; printing the heterogeneous conductor layer at one or more of the following positions: beneath the opacifier layer, onto the transparent film bottom surface, or combinations thereof. In one such embodiment, the opacifier layer contains a material which generates a negative color image. In another such embodiment, the opacifier layer contains a material that includes a UV taggant, a structural taggant and an infrared taggant.

In another embodiment, the method of the present invention provides for printing the coloring layer to have an external shape corresponding to a positive shape of the image and an internal shape that extends beyond the positive image shape.

In another embodiment, the method further includes the step of printing at least a portion of the conductor layer beneath the coloring layer.

In yet another embodiment, a method of the present invention may further include the step of: printing a passivator layer beneath the conductor layer and the coloring layer.

In yet another embodiment, the method of the present invention further includes the step of: printing one or more conductive tracks to thereby generate charge injection point co-located with the image.

In yet another embodiment, the method of the present invention includes a step of collecting an optical property or spectral property, at different levels of coloring, of selected areas of the display and storing such data in a database for future comparison.

BRIEF DESCRIPTION OF THE DRAWINGS

The accompanying drawings, which are included to provide further understanding of the disclosure and are incorporated in and constitute a part of this specification, illustrate embodiments of the disclosure and, together with the description, serve to explain the principles of the disclosure.

In the drawings:

FIG. 15 schematically represents an exemplary method of manufacturing a display device of the present invention wherein;

FIG. 16C schematically represents the coloring layer of the display device illustrated in FIG. 16A.

DETAILED DESCRIPTION OF THE PREFERRED EMBODIMENTS

Figure 1:
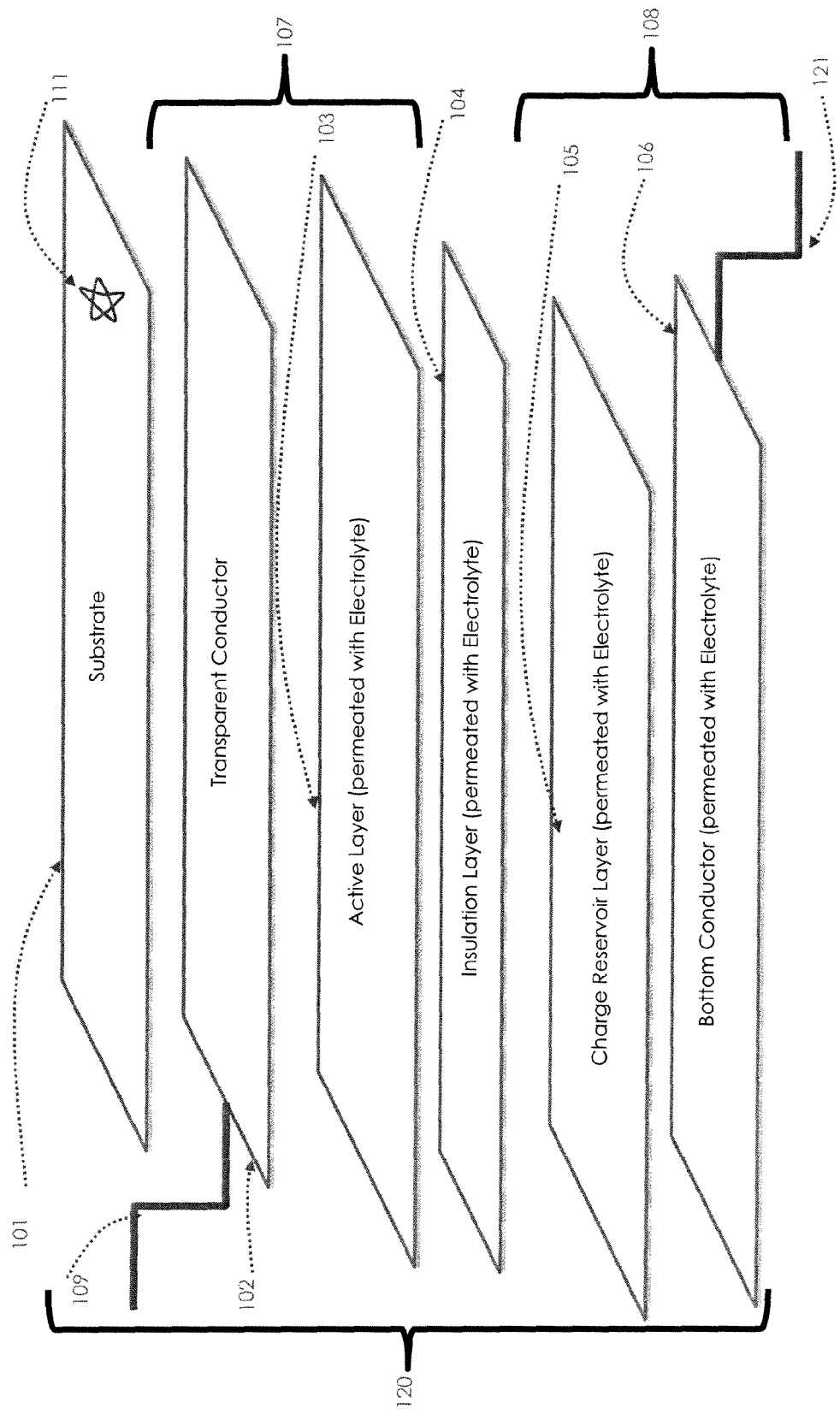
FIG. 1 schematically represents an exemplary prior art system.

Reference will now be made in detail to the preferred embodiments of the present disclosure, examples of which are illustrated in the accompanying drawings. Wherever possible, the same reference numbers will be used throughout the drawings to refer to the same or like parts.

The present disclosure provides for an inventive display device having: a coloring electrode positioned on a transparent film; a second electrode; a separator layer positioned between the coloring electrode and the second electrode; and electrolyte. The coloring electrode is formed from a connected conductor system of one or more heterogeneous conductive areas and a coloring area where the coloring area is directly deposited onto the transparent film without the heterogeneous conductive areas positioned between the transparent film and the coloring area. The disclosure is summarized in the following sections: (A) Display Design and Method of Manufacture; (B) Material Compositions (used to generate the inventive display); and (C) Security Applications.

The display devices of the present disclosure provide for several advantages over prior art displays. The reflective brightness of the display is enhanced because there is no transparent conductor placed between the viewer and the coloring or chromic area. Contrast ratio is improved because the reflective and chromic materials have no inhibition to their respective bright or dark state reflectance. Parallax effects are minimized because the reflective material is in direct contact with the substrate. Because the conductor layer is not in viewing path, it does not need to be transparent. Placement of the conductor layer outside of the coloring or chromic area results in several design features not possible heretofore, including: the conductor material may display electrochromic properties, such as PEDOT:PSS and conductive polymers; the conductor layer does not need to be made using transparent (or nearly transparent) conductive material; the conductor material can have high conductivity (that is reduced ohmic losses) because choice of appropriate material is not restricted to transparent materials; the conductive material can also be applied with a larger thickness than traditional conductor layers; and the conductor layer can be applied as a block (that is over substantially the entire electrode, thus with limited care for registration and fine features). The present disclosure provides for display devices with a passivator layer that can be opaque to cover the conductor layer and the track lines of the conductor layers. This is especially helpful for multiple segment, typically 7 segment or 13 segment, display designs.

The present disclosure provides for a method of manufacture wherein the chromic or coloring layer is printed directly onto a film (or substrate) without a conductor layer between the film and chromic or coloring layer. This method of manufacture also allows for the printing of a conductor layer as a pattern in the lateral direction as opposed to prior art designs. This novel manufacturing process results in a device having a working electrode with conductivity in three dimensions, something hereto not achievable.

Figure 2:
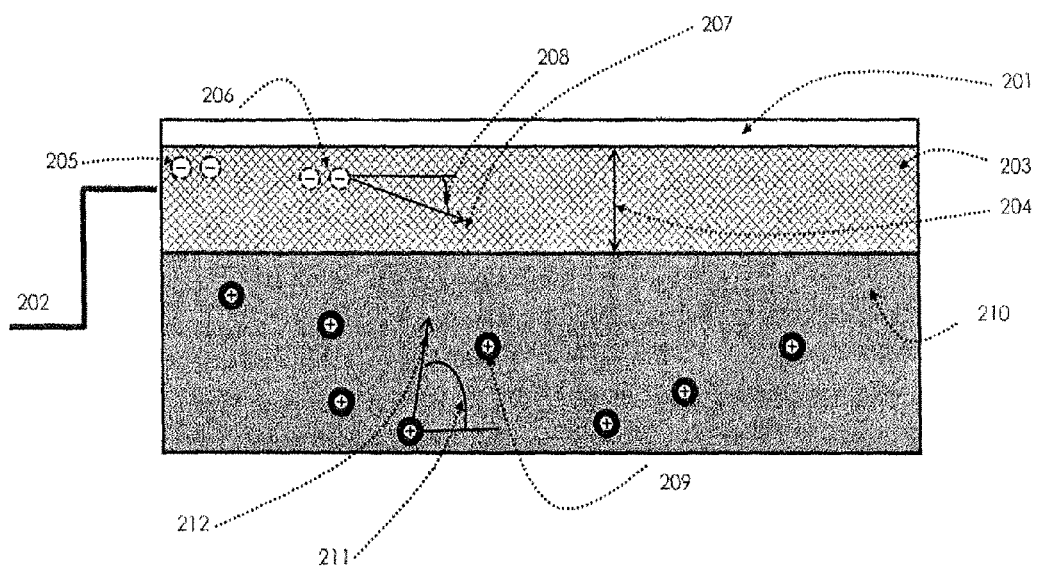
FIG. 2 conceptually illustrates a working electrode which controls electrical charge conduction in the lateral direction and ionic conduction in the transversal direction.

Color changes occur when charges (electrons or holes) are brought to the electrochromic material. For the color change to occur an electronic path to the chromic material must be established and a counter charge in the form of ions or protons brought into their vicinity. FIG. 2 illustrates the concepts and use of lateral and transversal conduction related to the operation. In this embodiment, the monolith electrochromic display is viewed through the top substrate (201). A conductive track (202) brings or removes charges to the electrode. It is connected electronically to a heterogeneous conductive layer (203). This layer can be composed of a heterogeneous set of conductors and/or one or more chromic areas. This layer has thicknesses (204) varying from a few to tens of micrometers. Electrons (205) introduced by the conductive track (202) will travel inside the conductive layer (203). Electrons (206) will travel typically a path of least resistance (207). The angle (208) between local substrate boundary and actual direction of electrons travel will be a small angle, less than 45 degree at the microscopic level. As electrons travel, ions (209) will percolate through a series of porous materials (illustrated as a whole as (210)) permeated with electrolyte(s) to provide a counter charge. The angle of travel (211) measured between the direction of the bottom boundary of the substrate and the direction of the ions (212) will be close to a right angle.

A. Display Design and Method of Manufacture

FIGS. 3-16D illustrate various embodiments of a coloring electrode for various display designs. Although not shown, each coloring electrode has an associated counter electrode. An embodiment of such an associated counter electrode includes a capacitive layer and a conductor layer.

Figure 3:
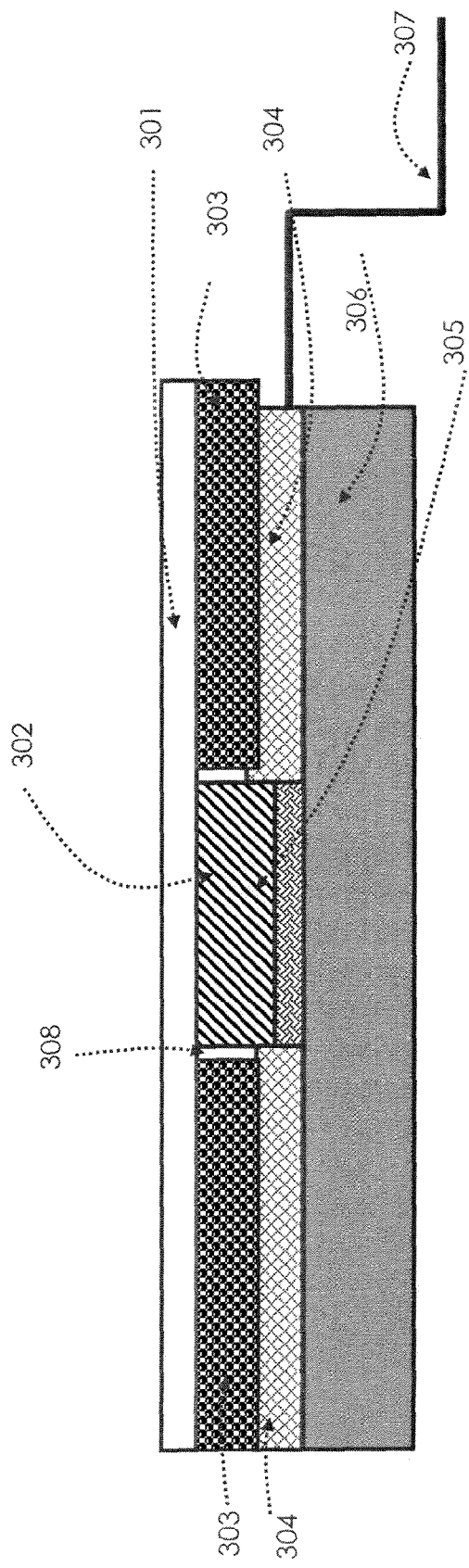
FIG. 3 schematically represents an exemplary coloring electrode of the present invention in which a conductor layer is placed beneath a coloring layer.

FIG. 3 shows an embodiment using the control in electrical charge conduction to create a working electrode with improved optical performance. This is accomplished by complementing the low conductivity of the chromic layer with a higher conductor patterned behind it. In this embodiment, the monolith electrochromic display is viewed through the top substrate (301) which can be a layer material as discussed in Part B below. Printed on this substrate, a chromic layer (302) is deposited directly as the positive of the image being displayed. The chromic layer is typically ionically and electronically conductive. In a preferred embodiment, it is constituted of a mixture of semiconducting or conducting nanoparticles onto which chromogens have been adsorbed. An opacifier layer (303) is applied as the negative of the image. A heterogeneous conductor material (metal, organic, semiconductor) layer (304) is deposited on at least a part of the inside of the display connected to layer (302). Layer (304) can be patterned to facilitate the conduction of charge to the chromic layer. An optional additional conductive layer (305) is deposited behind the chromic area to facilitate lateral charge transfer (also connected to 304). This layer is helpful when the lateral electronic conductivity of (302) is very small. The introduction of a conductive layer (305) having high conductivity underneath the chromic layer (302) allows the use of chromic layer with reduced conductivity such that the binder concentration used in the coloring composition ink can be increased in the manufacturing process. The material for this layer (305) can be the same for layer (304). In one embodiment, layer (305) can also be an active matrix. While it is not part of the working electrode, the separator (306) is shown. A conductive track (307) is bringing charges to the internal conductor. Because a preferred way of manufacturing displays is printing, the introduction of a non-functional ink, (i.e., graphic ink) that is compatible with printing allows this type of display to be totally printed.

Depending upon the nature of materials, a gap (308) might be necessary to prevent destructive interaction during the printing process. Certain opacifiers are reactive materials (a mixture of material akin to commercial epoxy glues). If they were to contain amines, they could interact with a viologen based chromic layer. If the printing order is first opacifier (303), then viologen based chromic layer (302), a gap will prevent this interaction. If the printing order is the opposite (302 then 303), the interaction will not take place and the gap is not needed.

In one embodiment of FIG. 3, the opacifier layer (303) and the chromic layer (302) can include traceable materials such as UV, infrared and structural taggants (such as those offered by Kodak and JDSU) and other security inks. Taggants are widely used in security applications as overt (visible to the human eye but difficult to reproduce) as well as forensic (visible only using a machine). Examples of use are drivers' licenses, passports, tax stamps, brand labels.

The current invention improves the printing of multi-chromic segmented displays by leveraging the difference in lateral electronic conductivity between the system of conductors and the chromic layer of the working electrode. In one embodiment of this invention, a single chromic layer can be used as the basis of different chromic material segments displayed to the end user.

Figure 4:
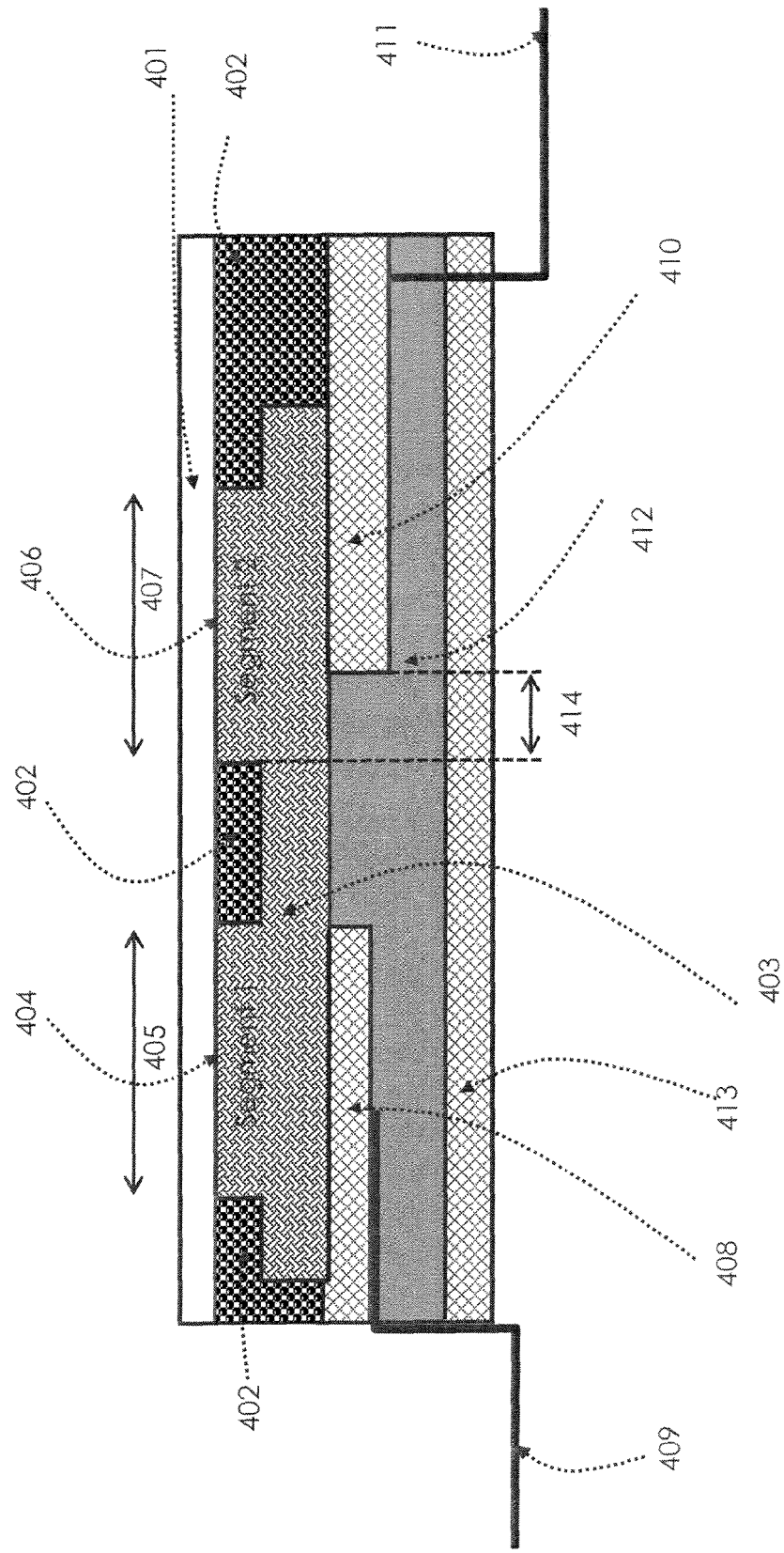
FIG. 4 schematically represents an exemplary coloring electrode of the present invention wherein single coloring layer has two individually addressable color segments, each connected to an independent heterogeneous conductor layer.

FIG. 4 shows such an embodiment where a single chromic layer (403) is deposited as a block, thus requiring limited alignment with other layers of the electrode. This is an example of control of lateral conductivity where the low conductivity of the chromic layer is purposefully not complemented by a conductive block. In this embodiment, the monolith electrochromic display is viewed through the top substrate (401). Printed on this substrate, a layer (402) of opacifier material is deposited as the negative shape of the set of images to be displayed. In one embodiment, this opacifier layer (402) can be sub-patterned, that is support graphic designs. A single contiguous block of chromic layer (403) is then deposited such as it extends over the positive image created by the opacifier pattern. This chromic layer is designed to have poorly conductive, using e.g. $TiO_2$ or ZnO nanoparticles. In this embodiment, two independent addressable segments connected to independent heterogeneous conductor layers are supported. Segment 1 (404) has a viewing area (405) indicated by an arrow (this is evidently a two dimensional segment, but the principles of operation described in FIG. 4 apply accordingly). Segment 2 (406) has a viewing area (407) indicated by an arrow. The first part of the conductive layer (408) below segment 1 (404) can be composed of metal, organic, semiconductor material. A conductive track (409) is bringing charges to the conductor layer (408), with a feeding "point" being in fact a line located across the conductor layer (408). The second part of conductive layer (410) below segment 2 (406) can be composed of metal, organic, semiconductor material. A conductive track (411) is bringing charges to the conductor layer (410), with a feeding point located across the conductor layer (410). Nothing prevents conductor layers (408) and (410) to be of different thickness or material for that matter. While not part of the working electrode, the separator (412) supports ions transfer between working electrode and counter electrode (413). In this embodiment, the chromic layer (403) is both ionically and electronically conductive, but of a lateral conductivity much reduced compared to the conductors (408) and (410). When charges are brought through the conductive track (411) only the area under segment 2 (406) will be charged and only that segment will change color. Vice-versa, when charges are brought through the conductive track (409) only the area under segment 1 (404) will be charged and only that segment will change color.

The points of connection between conductive tracks and conductors will impact the coloring electro-optic effects achieved by the working electrode. The alignment gap (414) between end of the conductive structure and the edge of Segment 2 (406) affects the speed of coloring. The larger (414) is, the slower the coloring will take place. This has the advantage of creating displays with icons of the same shape and form that color and bleach at different rates even when supplied by the same voltage.

The present disclosure provides for novel patterning of the electrochromic layer. Heretofore, the pattern of the chromic material had to be set exactly to the image being presented to the end user (See Coleman U.S. Pat. Nos. 5,500,759 and 6,582,509; Brabec et al. PCT application EP2005/056014 for typical examples). This limit enforces the need for precise alignment/registration of the printing of chromic layer material. When looking at printing displays and systems that include displays using screen-printing, the alignment that can be achieved using a web sheet process is typically +−50 um. In contrast, the registration achievable using a roll-to-roll process is a not smaller than +−120 um. The resolution achievable with screen-printing is about 100 um. Based on these capabilities, printing the maximum precision chromic layer is problematic for a roll-to-roll process, especially if the chromic layer is deposited on a conductor layer that has varying thickness or variation in surface energy. Legacy designs exhibit another related significant implication for electrochromic systems where multiple areas of the display are independently addressable, such as the 7 chromic alignment of a 7 chromic segments digit. In legacy designs, this limitation forces a different design of a print screen for the chromic layer for each design manufactured at a plant, reducing manufacturing flexibility. The present disclosure solves this problem by providing for systems and methods of manufacture wherein the chromic layer is deposited with an area of overprint as illustrated in FIG. 5.

Figure 5:
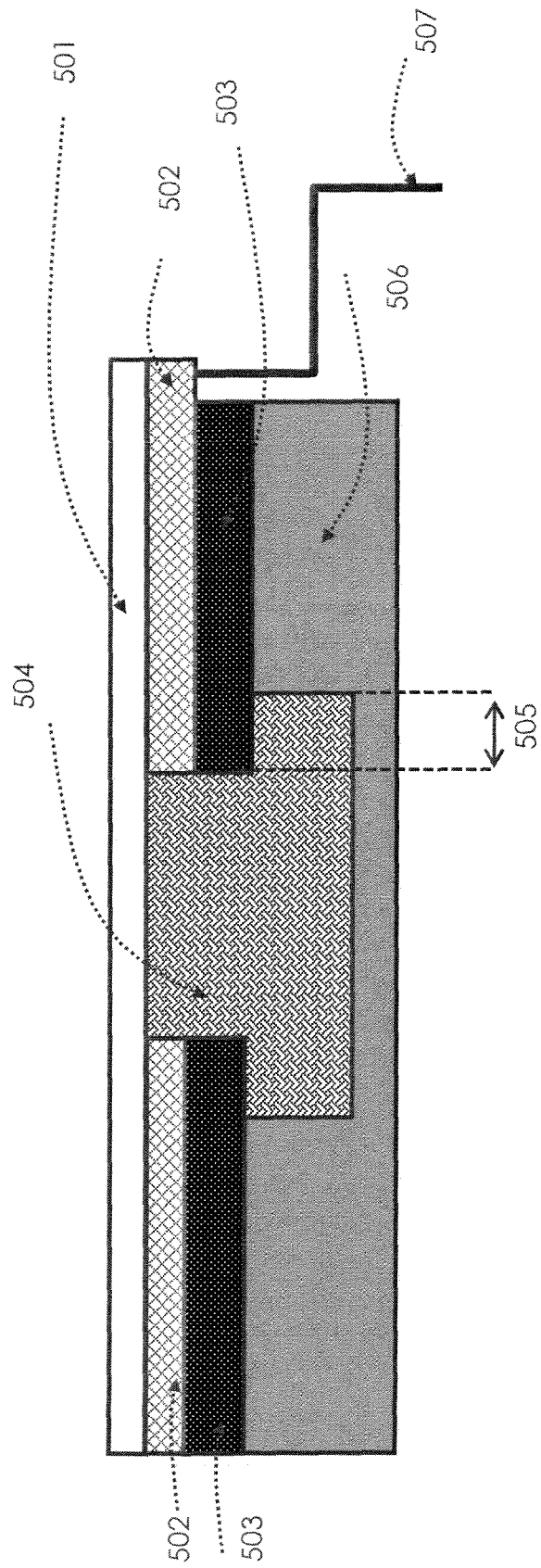
FIG. 5 schematically represents an exemplary coloring electrode of the present invention where the color layer is deposited so that the bottom section of the color layer encompasses a larger area than the user visible area.

FIG. 5 shows the embodiment of an advanced electrode where both electronic and ionic controls are used and where the chromic layer is deposited over a wider region than the user visible area. In this embodiment, the monolith electrochromic display is viewed through the top substrate (501). On this substrate (501), a transparent conductor material (metal, organic, semiconductor) layer (502) is deposited in a pattern on part of the inside of the display. This conductive layer (502) can be ionically conductive. A passivator layer (503) (dense) is deposited next onto the conductor layer (502) (that is on the negative of the image). This passivator layer (503) is ionically and electrically isolative. Connected to these layers (502) and (503), the chromic layer (504) that contains electrochromic material is deposited. It is typically ionically and electronically conductive. The combination of layers (502) and (504) creates a heterogeneous conductive structure. The area of the chromic layer visible through the substrate (that is through the negative of the passivator layer (503) corresponds to the active color area of this working electrode. The area of overprint (505) will impact the electro-optic response of the block and power consumption during switching/bleaching, but it does not impact the image visible to the end user. This approach heretofore not considered in legacy designs allows the deposition of the chromic layer to be looser with respect to printing accuracy and registration. It enables faster and less expensive manufacturing set up. While it is not part of the working electrode, the separator (506) is shown. A wire (507) brings the charges to the working electrode. In this embodiment, it attaches to the side of the transparent conductor and is out of sight of the end user. The introduction of a dense passivator between working electrode and separator allows the motion of ions to be limited to specific areas. Areas where the passivator is present have an infinite ionic resistance. The passivator also reduces the probability of a short being created between working and counter electrode. It will thus improve bi-stability of the resulting displays. This is in contrast with Agrawal et al. U.S. Patent Application Publ. No. 2007/0139756 that looks at improving bi-stability by introduction of special electrolytes that are themselves capable of being reduced. The current invention yields less expensive solutions and more durable solutions (since few elements are subject to the stress of redox processes). As illustrated in FIG. 5, the conductor layer (502) is visible to the viewer. In another embodiment, an opacifier layer could be placed between the substrate and the conductor layer to hide this layer while still retaining the feature of limiting the motion of ions to specific areas of the working electrode.

Figure 6A:
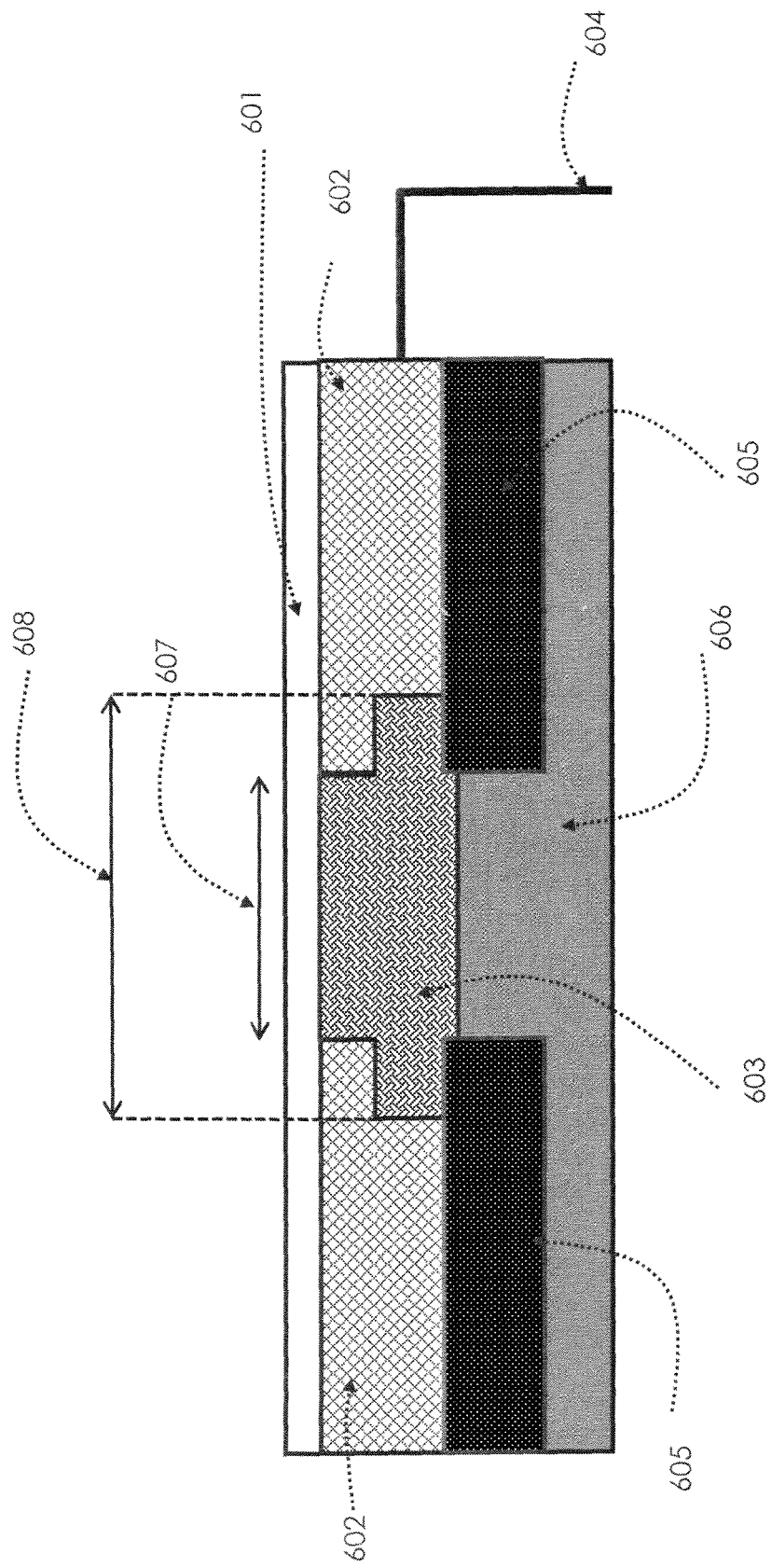
FIGS. 6A and 6B schematically represent an exemplary coloring electrode of the present invention in which ionic conductivity is controlled through the introduction of a passivator layer at the bottom of the working electrode with a conductor layer and a coloring layer located on the substrate.

FIG. 6A shows an embodiment where ionic conductivity is controlled through the introduction of a passivator at the bottom of the working electrode with the conductor layer (602) and the chromic layer (603) located on the substrate (601). It is similar in principal to FIG. 5 except that the printing order between these two embodiments is slightly different. In this embodiment, the monolith electrochromic display is viewed through the top substrate (601). A patterned conductive layer is then deposited (602). The chromic layer (603) is then deposited. The chromic layer is typically ionically and electronically conductive. A conductive track (604) is used to bring charges to the conductor layer (602). In FIG. 5, chromic layer (504) is printed after the passivator layer (503). In FIG. 6, the passivator layer (605) is printed after the chromic layer (603). If the conductive layer (602) is opaque, then the area (607) of the chromic layer (603) visible through the substrate (601) corresponds to the active color area of this working electrode. If the conductive layer (602) is transparent, then the area (608) of the chromic layer (603) visible through the substrate (601) corresponds to the active color area of this working electrode.

A passivator layer (605) is placed under the conductor layer (602). In this embodiment, the passivator layer (605) is patterned as the negative shape of the image. Passivator layer (605) blocks transversal ionic conductivity outside the positive of the image being displayed. This protects the conductive layer (602) from the electrolyte and enables a wider choice of metals. While it is not part of the working electrode, the porous and ionically conductive separator (606) is shown.

This embodiment can be extended for security applications by mixing appropriate materials in the chromic layer (603) and passivator layer (605). In one such embodiment, UV taggants, structural taggants, infrared taggants (such as those offered by Kodak and JDSU) and other security inks can now readily be used inside the display itself by incorporation into layer (603). Taggants are widely used in security application as a covert (visible to the human eye but difficult to reproduce) as well as forensic (visible only using a machine).

Figure 6B:
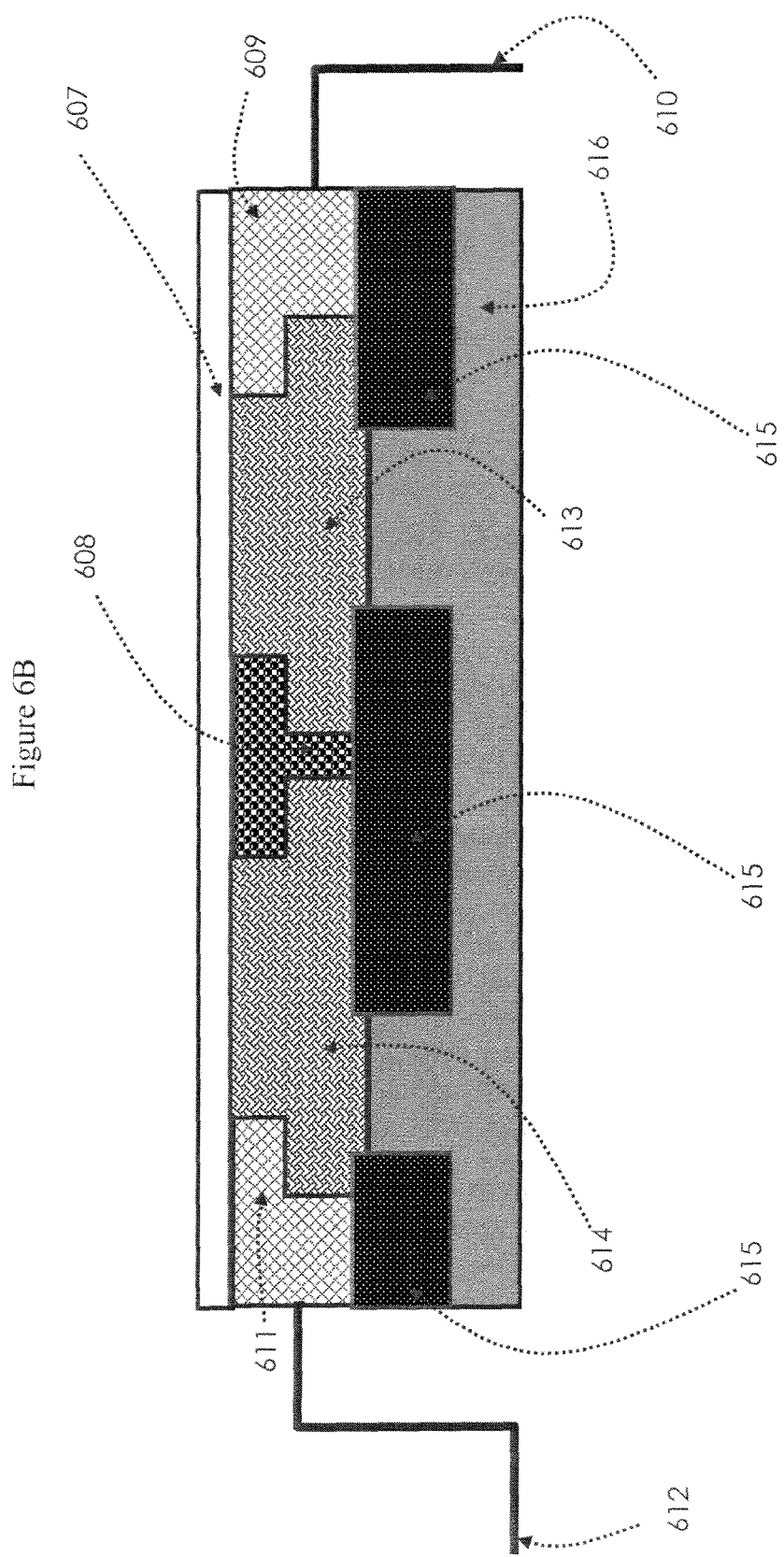

FIG. 6B shows an extension of FIG. 6A where two independent chromic segments (614) and (615) are controlled by independent conductor layers (611) and (609), respectively. In this embodiment, the monolith electrochromic display is viewed through the top substrate (607). An opacifier layer is deposited (608) first; the patterned conductive layer (609) is then deposited. Conductor layer (609) is connected to the conductive track (610). A second patterned conductive layer (611) is then deposited and connected to the conductive track (612). The chromic layers (613) and (614) are then deposited. A passivator layer (615) is used to block ionic motion in the transversal direction. While it is not part of the working electrode, the porous and ionically conductive separator (616) is shown.

This embodiment can be extended for security applications by mixing appropriate materials in layers (613) and (614). UV taggants, structural, infrared taggants (such as those offered by Kodak and JDSU) and other security inks can now readily be used inside the display itself. Taggants are widely used in security application as a covert (visible to the human eye but difficult to reproduce) as well as forensic (visible only using a machine).

As illustrated in FIGS. 6A and 6B, the conductor layer (602) is visible to the viewer. In another embodiment, an opacifier layer could be placed between the substrate and the conductor layer to hide this layer while still retaining the feature of limiting the motion of ions to specific areas of the working electrode.

Figure 7:
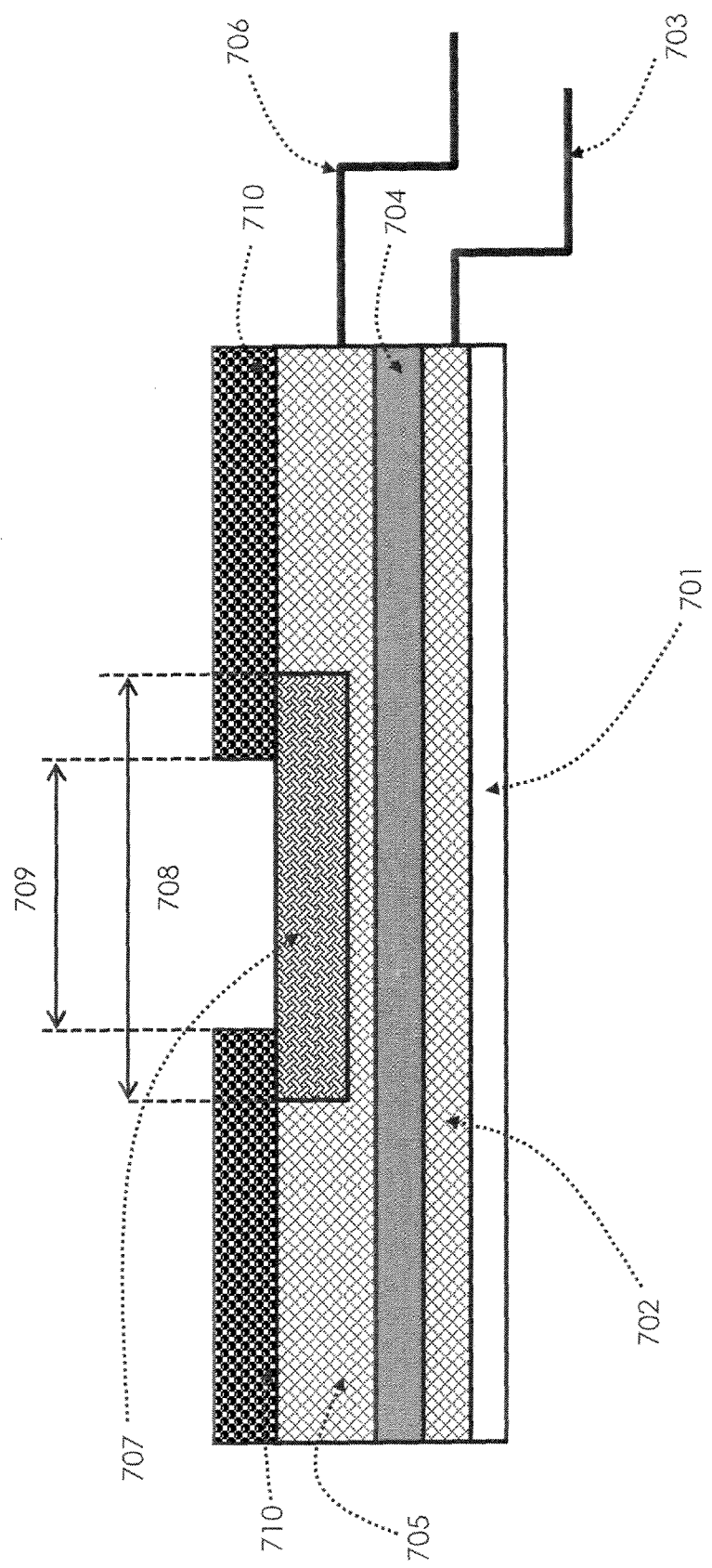
FIG. 7 schematically represents an exemplary display device of the present invention in which the substrate is located on the back side of the device and wherein a coloring layer is deposited so that the bottom section of the color layer encompasses a larger area than the user visible area and a conductor layer is located under and to the side of the coloring layer.

FIG. 7 shows the embodiment of an advanced electrode where the chromic layer is printed over a wider region than the user visible active area and the conductor is printed over (substantially) the entire electrode. In this embodiment, the monolith electrochromic display is built on a bottom substrate (701). The counter electrode (702) is deposited next (details of this electrode are not shown in this figure). A conductive track (703) brings the charges to the counter electrode. A separator layer (704) is deposited next. It is porous to supportionic conductivity of electrolyte. A block conductor layer (705) is then deposited to form the bottom of the working electrode. In this embodiment, this conductor (metal, organic, semiconductor) must be ionically and electronically conductive. It is a heterogeneous design as the thickness varies across the display (this can be achieved by using multiple deposition steps. The conductive track (706) brings charge to the working electrode. The chromic layer (707) is deposited next over an area (708) larger than the desired viewing area (709). Opacifier (710) is then printed as the negative shape of the image.

Figure 8:
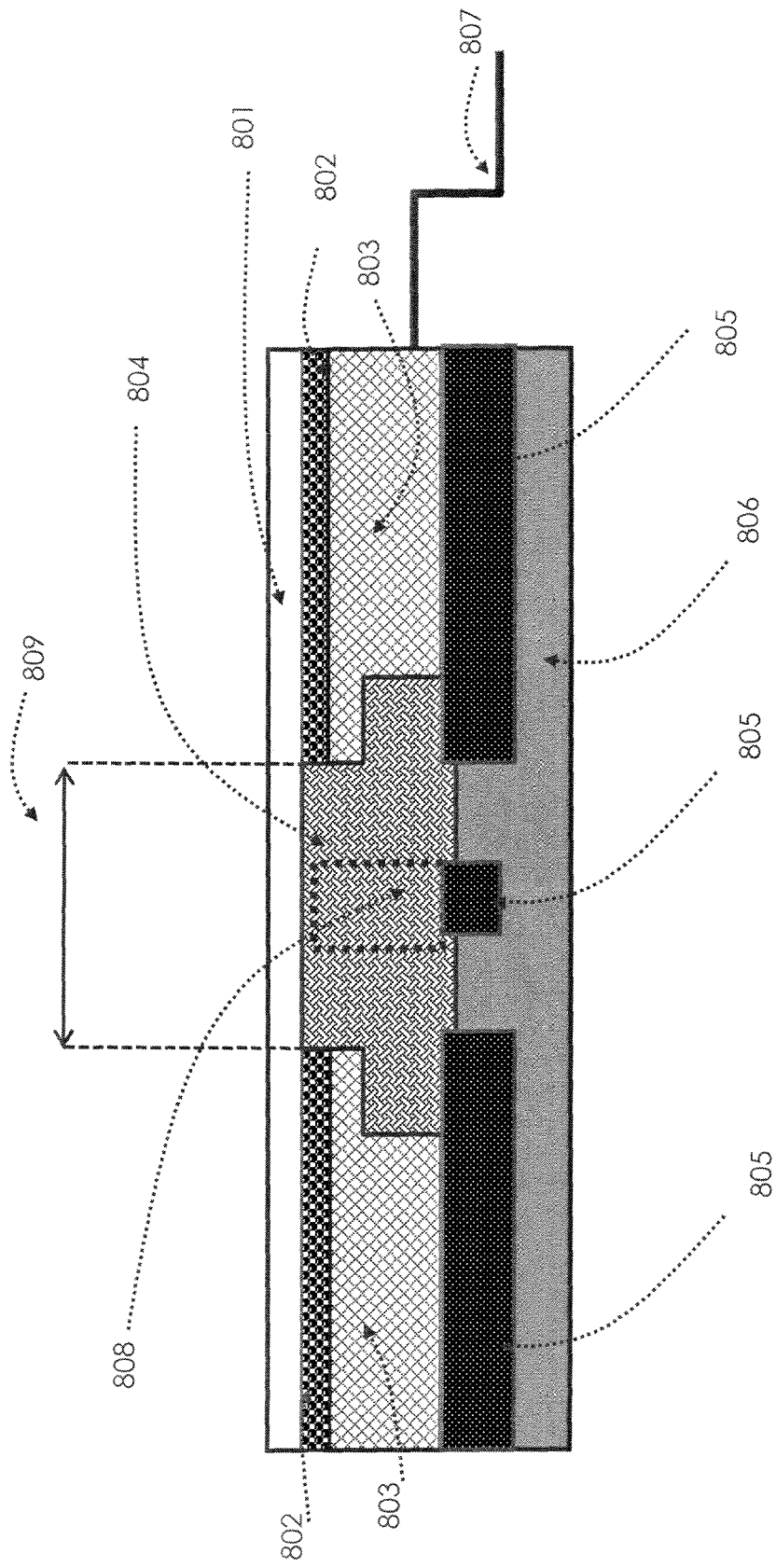
FIG. 8 schematically represents an exemplary coloring electrode of the present invention, where a passivator layer is located beneath a heterogeneous conductor layer and one section of the passivator layer is shaped as the image negative and the second portion of the passivator layer is located below the coloring layer.

FIG. 8 is an enhancement of the previous embodiment where the conductive structure is hidden from the end user. In this embodiment, the monolith electrochromic display is viewed through the top substrate (801). An opacifier layer (802) patterned as the negative shape of the image is deposited. In one embodiment, the opacifier layer (802) can itself be sub-patterned. A conductor material (metal, organic, semiconductor) layer (803) is deposited on part of the inside of the display. The chromic layer (804) that contains electrochromic material is deposited next. The chromic layer (804) is typically ionically and electronically conductive. A patterned passivator (805) is deposited next and will impact the electro-optic response of the block and power consumption during switching and bleaching. While it is not part of the working electrode, the separator (806) is shown. A conductive track (807) brings changes to the conductive layer. Because the passivator impedes the ionic conduction, coloring will be affected. The area (808) located above the center of the passivator block (805) will switch at a slower rate than the rest of the chromic layer (804). The area (809) of such a layer visible through the substrate corresponds to the active color area of this working electrode. This design allows the creation of an iris coloring effect.

There is a need for a class of graphic displays to have a display that does not reveal the image to be displayed to the human eye until the image is activated (for instance a lottery ticket with a WIN vs. LOSE message). This is in contrast with numeric (typically 7 segment displays) and alphanumeric (13 segment displays) where the user knows a-priori the set of message that can be displayed. There is also a need for lifetime color for many certain applications, such as say medical sensors where the user compares the hue and intensity of a colored chromic layer against a reference (printed on the same substrate or a card).

There is also the need for a display structure that shows words such as NO POWER when no power is being applied. This has to be achieved using no power.

Figure 9:
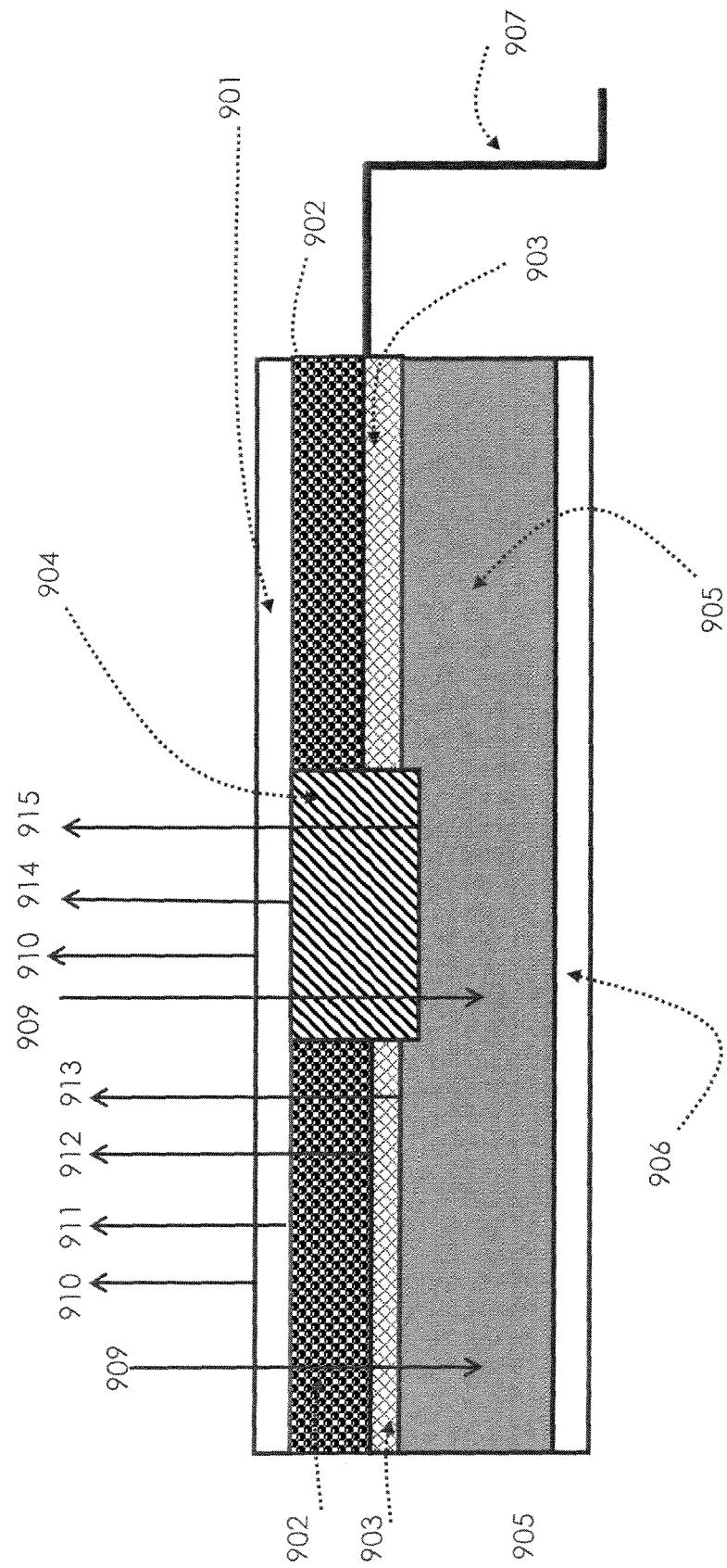
FIGS. 9 and 10 schematically represent an exemplary coloring electrode of the present invention to achieve color matching between the image and the area outside the image.
Figure 10:
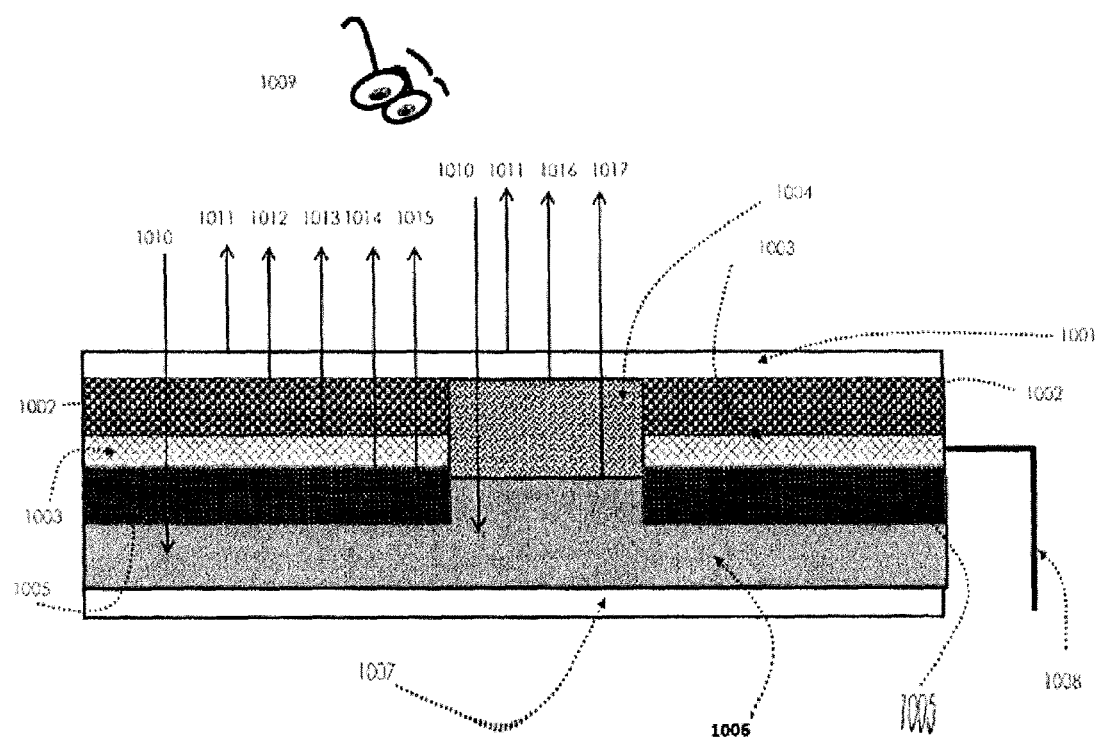

The embodiments illustrated in FIGS. 9 and 10 provide a solution to these needs using color matching described below.

In one embodiment for color matching, an opacifier layer is the first layer deposited on the inside of substrate for SEG on substrate and sandwich architectures. This opacifier layer is a dense colored patterned film. It can be made opaque or translucent. It covers portions of the conductor structure and when warranted part of the chromic material, that is essentially the negative of the set of images being displayable by the system. In the case of a COM on substrate or SEP as substrate, the passivator can be applied before the electrolyte is applied during the manufacturing process. As shown in FIG. 9, the monolith electrochromic display is viewed through the top substrate (901). This substrate can be realized from material such as PET, PETG, PEN, thin glass, bendable glass, or any other transparent material. On this substrate, an opacifier layer (902) (dense) is placed next to substrate 901. This opacifier layer (902) is ionically and electrically isolative passivator layer and is patterned as the negative of the image. A conductor material (metal, organic, semiconductor) layer (903) is deposited in a pattern on part of the inside of the display. This conductive layer (903) can be ionically conductive. Connected to the opacifier layers (902) and (903), the chromic layer (904) is placed. It is typically ionically and electronically conductive. While it is not part of the working electrode, the separator (905) is shown as it contributes to the image quality. The counter electrode is layer (906). A conductive track (907) brings the charges to the working electrode (The observer (908) looks at the display from the top of the structure. Light (909) illuminates the structures and is reflected by a multitude of layers. From the area of the negative of the displayed image, the observer sees light reflected by the substrate itself (910), the opacifier (911), the conductive layer (912)—if the opacifier layers (902) and the conductive layer (903) are not too opaque to prevent light from reaching it—, the separator (913)—if the combination opacifier+conductor layers is not too opaque to prevent light from reaching it. In the positive of the display image, the light is reflected by the substrate itself (910), the chromic layer (914)—of course that reflection is affected by the charge present in the layer—, the separator layer (915)—if the chromic layer is not too opaque to prevent light from reaching it. The introduction of the opacifier layer (902) enables more readily color matching across the system. Color matching can be achieved by mixing color agents into any of the layers (902), (903), (904), (905) so that the visible color of the image in its off-or-on-state matches the visible color of the negative of the image. Examples of these coloring agents are provided in the table of materials usable for passivator elsewhere in this patent application. This is true because we need to balance 910+911+912+913=910+914+915 which is the equivalent of 911+912+913=914+915. We have more independent variables than in a case where no opacifier was present and the balance would have been 912+913=914+915. This embodiment enables the creation of displays that show not patterned either when turned off (chromic layer (904) is not charged), or when turned on (chromic layer (904) is charged). This embodiment can be extended for security applications by mixing security materials, such as UV, structural or infrared taggants in the layers (902) or (904).

There is also the need for a display structure that shows words such as NO POWER when no power is being applied. This has to be achieved without using no power. Champion et al. introduce a security device leveraging electrochromism in U.S. Pat. No. 7,599,109. But it requires power to display messages. The current embodiment enables using a color negative of the image that is being displayed. This is achieved by managing the color matching equation 911+912+913=914+915 where 914 is reflected by the chromic layer in the colored state.

FIG. 10 shows an enhancement of the previous embodiment based on the introduction of a passivator layer at the bottom of the working electrode. This passivator enhances the capability for color matching (along with protection of undesired interactions between conductive layer and electrolyte.) In the current invention, color matching is enhanced by the introduction of a passivator layer between working electrode and separator. In the case of a COM on substrate or SEP as substrate, the passivator can be applied before the electrolyte is applied during the manufacturing process.

In this embodiment, the monolith electrochromic display is viewed through the top substrate (1001). An opacifier layer (1002) (dense) is placed next to (1001). The opacifier layer is patterned as the negative shape of the image. A conductor material (metal, organic, semiconductor) layer (1003) is deposited in a pattern on part of the inside of the display. This conductive layer can be ionically conductive. Connected to the layers (1002) and (1003), the chromic layer (1004) is placed. It is typically ionically and electronically conductive. A passivator layer (1005) ionically and electrically isolative is then placed. While it is not part of the working electrode, the separator (1006) and the counter electrode (1007) are shown. A wire (1008) brings the charges to the working electrode. The observer (1009) looks at the display from the top of the structure. Light (1010) illuminates the structure and is reflected by a multitude of layers. In the negative of the image, the observer sees light reflected by the substrate itself (1011), the opacifier (1012), the conductive layer (1013)—if the opacifier is not too opaque to prevent light from reaching it—, the passivator (1014)—if the combination opacifier/conductor layers is not too opaque to prevent light from reaching it and the passivator (1015) if the combination opacifier/conductor/passivator is not too opaque to prevent light from reaching it. In the positive of the image, the light is reflected by the substrate itself (1011), the chromic layer (1016)—of course that reflection is affected by the charge present in the layer—, the passivator layer (1017)—if the chromic layer is not too opaque to prevent light from reaching it. The introduction of the opacifier layer 1002 and passivator layer (1005) enables more readily color matching across the system. This is true because we need to balance 1011+1012+1013+1014+1015=1011+1016+1017 which is the equivalent of the color matching equation 1012+1013+1014+1015=1016+1017. We have more independent variables than in a case where no opacifier nor passivator were present and the balance would have to be 1013+1015=1016+1017. This embodiment enables the creation of displays that show no pattern when either turned off (chromic layer (1006) is not charged), or when turned on (chromic layer (1006) is charged). This embodiment can be extended for security applications by mixing appropriate materials in the layers (1002), (1004) and (1005). UV taggants, infrared taggants and other security inks can now readily be used inside the electrochromic cell enabling designs that are significantly more difficult to duplicate/pirate than traditional (static) security solutions such as a hologram. It should be noted that layer (1002) could be a printed hologram as well.

Figure 11:
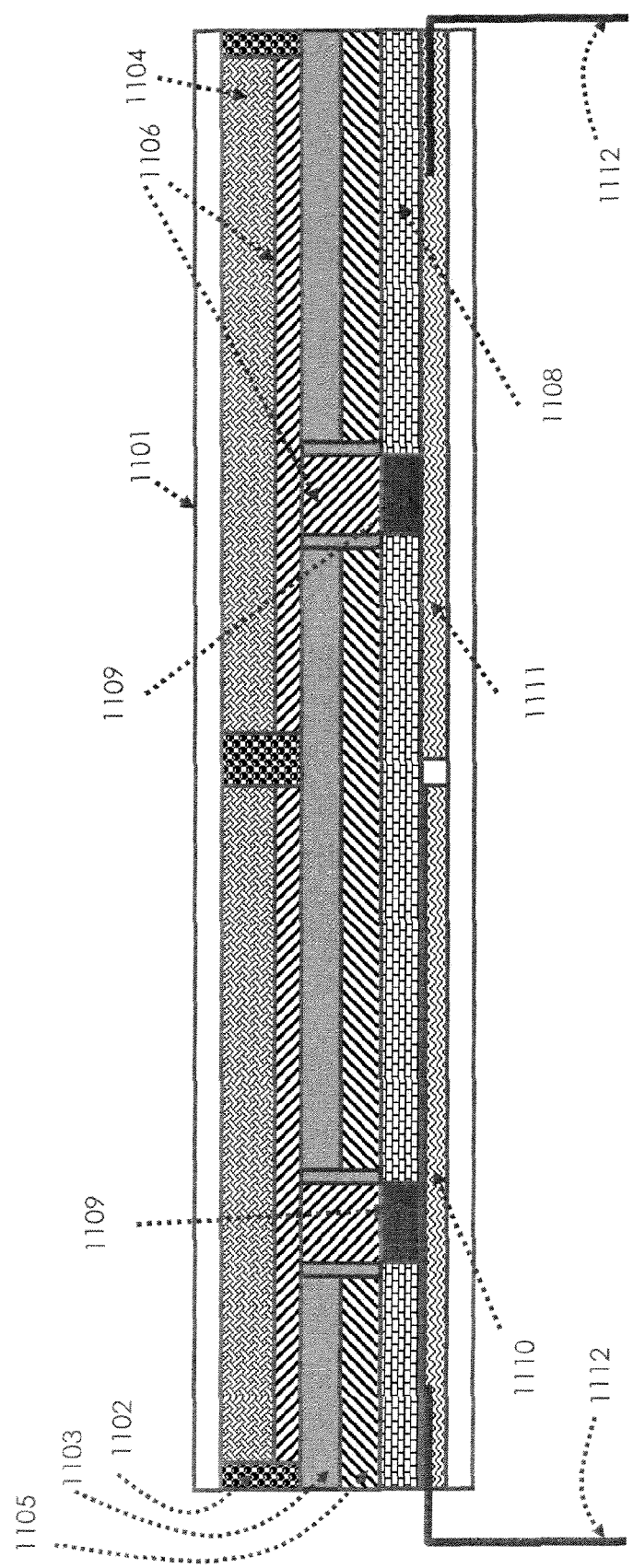
FIG. 11 schematically represents an exemplary multi-segment display arranged with control elements placed under the display.

FIG. 11 illustrates an embodiment of a part of a multi-segment display arranged as a regular matrix where control elements such as active matrix circuitry is placed under the display and connected by means of a via to the regularly spaced feeding points and where the driving electronics that comprise the matrix addressing are printed onto the display layers to maintain a single-substrate configuration where the display is viewed through the substrate. In this embodiment, the display device includes: (1101) is a laminate layer (for protection); (1102) is an insulator material; (1103) is a porous separator; (1104) is the working electrode; (1105) is the counter electrode; (1106) is a conductor material; (1108) is a dense insulator; (1109) is a via realized as a dense conductor; (1110) is matrix control circuitry; (1111) is the substrate (and because it is the back of the structure, it does not have to be transparent). The feed points to the matrix (1112) connect to the electronics driving this display, say row and column drivers.

Figure 12:
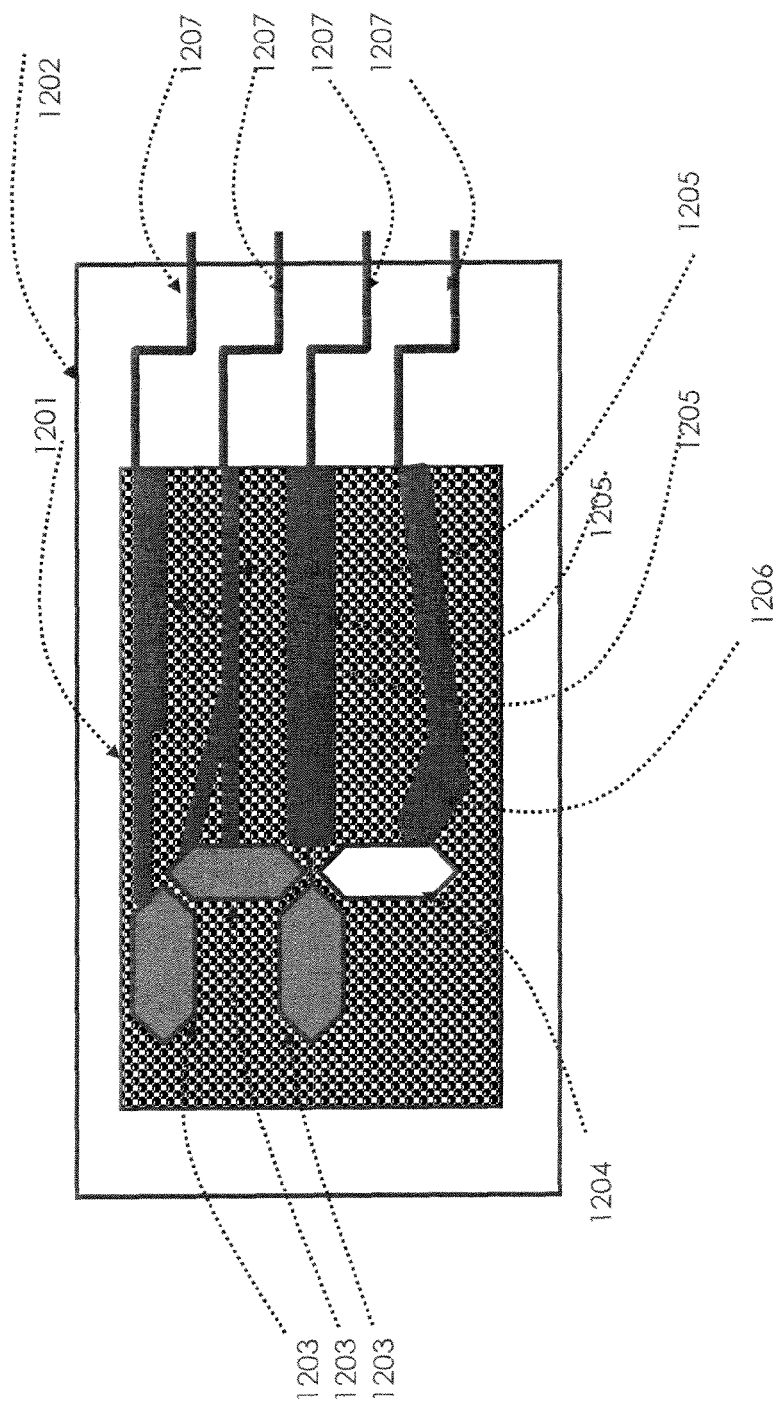
FIG. 12 schematically represents an exemplary coloring electrode of the present invention having hidden conductor tracks shown from the perspective of the separator layer.

FIG. 12 shows an embodiment where the heterogeneous conductor layer is used to manage switching behavior. This embodiment shows a working electrode with hidden tracks. The display is shown from the perspective of the separator. We see features that are hidden from the end user who will be viewing the structure from its opposite side. In this embodiment, the opacifier layer (1201) is applied to nearly or all the entirety of the substrate (1202) with gaps lefts for the icons or segments (1203 and 1204) filled with chromic layer material. Charges are brought through a series of conductive areas (1205) and (1206). The heterogeneous conductor areas can be made with different shapes, different metal, different thickness to accommodate different effects. Conductive tracks (1207) bring charges to these conductive areas. This heterogeneous conductive track system allows consistent coloring to take place across color segments. It supports certain segments to be colored with positive voltage (say 1203), that is the chromic layer uses oxidative electrochromic materials) and others colored with negative voltage (say 1204), that is the chromic layer uses reductive electrochromic materials. It can also support designs where the chromic layers (1203) and (1204) are both reductive but with different half wave potential.

An important enhancement enabled by this invention is aligning coloring effects among segments that use different chromic material. Table 1 and 2 show the redox potentials of a number of cathodic and anodic electrochromic compounds, respectively. The redox potentials for the cathodic electrochromic compounds in Table 1 were determined by cyclovoltammetry of the respective compound, either in solution or absorbed onto nanocrystalline $TiO_2$ on ITO-glass electrodes. The counter electrode was a glassy carbon rod, the reference electrode Ag/AgCl 3 M KCl (aq), and the electrolyte a 0.1M aq. bis(trifluoromethanesulfonyl)imide lithium salt solution, which was and purged with nitrogen for 15 minutes prior to measurement. For the measurements in solution, the working electrode was glassy carbon, and the compound was 1 mM in electrolyte. For the measurements of the compounds adsorbed onto electrodes, the electrolyte was brought to pH=3.5 by addition of bis(trifluoromethanesulfonyl)imide.

The redox potentials for the anodic electrochomic compounds in Table 2 were measured under the same conditions as the cathodic electrochromic compounds, except that 1 M tetrabutylammonium tetrafluoroborate in propylene carbonate (PC) or γ-butyrolactone (GBL) was used as electrolyte. The compounds were absorbed onto nanocrystalline FTO on ITO-PET electrodes.

For the examples in Table 1, the first one-electron reduction is a reversible process from a colorless dicationic to a colored monocationic state and is represented by its reduction half wave potential E½. The second one-electron reduction process from the colored monocationic to a slightly yellowish colored neutral state is electrochemically irreversible, and is therefore represented by its potential measured at peak center, Epc.

For the examples in Table 2, the first one-electron oxidation from a colorless neutral to a colored cationic state is represented by its oxidation half wave potential $E_{1/2}$.

TABLE 1

Redox Potentials for cathodic (reductive) electrochromic compounds

| Compound | | in solution | | on TiO$_2$ | |
|---|---|---|---|---|---|
| No. | Name | $1^{st} E_{1/2}$ | $2^{nd} E_{pc}$ | $1^{st} E_{1/2}$ | $2^{nd} E_{pc}$ |
| 1 | 1,1'-Bis-(2-phosphonoethyl)-4,4'-bipyridinium dichloride | −0.649 V | −0.957 V | −0.597 V | −1.13 V |
| 2 | 1-(4-t-Butylphenyl)-1'-(2-phosphonoethyl)-4,4'-bipyridinium dichloride | −0.381 V | −0.823 V | −0.428 V | −1.02 V |
| 2 | 1-(3,5-Dimethylphenyl)-1'-(2-phosphonoethyl)-4,4'-bipyridinium dichloride | −0.422 V | −0.882 V | −0.440 V | −1.08 V |
| 3 | 1-Benzyl-1'-(2-phosphonoethyl)-4,4'-bipyridinium dichloride | −0.535 V | −1.005 V | −0.532 V | −1.16 V |
| 4 | 1-(2-Phosphonoethyl)-1'-(4-phosphonomethylphenyl)-4,4'-bipyridinium dichloride | −0.542 V | −0.740 V | −0.496 V | −0.971 V |
| 5 | 1-(2-Phosphonoethyl)-1'-(2,4,6-trimethylphenyl)-4,4'-bipyridinium bis[bis(trifluoromethylsulfonyl)imide] | −0.503 V | −0.856 V | −0.509 V | −1.05 V |
| 6 | 1,1'-[1,2-Phenylenebis(methylene)]bis[1'-(2-phosphonoethyl)-4,4'-bipyridinium] tetrachloride | −0.394 V | −1.045 V | −0.488 V | −1.21 V |

TABLE 2

Redox Potentials for anodic (oxydative) electrochromic compounds

| Compound | | $1^{st} E_{1/2}$ | |
|---|---|---|---|
| No. | Name | Electrolyte: PC | Electrolyte: GBL |
| 7 | 6-(2-Phosphonoethyl)thiophenazine | +0.800 V | +0.842 V |
| 8 | 4-[4-(Diphenylaminobenzyl-amino)-benzyl]phosphonate | +1.108 V | +1.101 V |

As the examples for cathodic electrochromic compounds in Table 1 show, different electrochromic compounds have different redox potentials. In the case of a device, where different pixels are functionalized with different electrochromic materials to achieve a pattern of different colors, the application of a single voltage value to all pixels will lead to unsatisfactory results, as the electrochromic compounds require different voltage values for optimal coloration. Compounds, which have a more negative first E½ value than the applied voltage, will show a weaker coloration, while compounds, which have a more positive first E½ value than the applied voltage, will be "overdriven", i.e. partial irreversible second reduction will take place, leading to a decreased lifetime of the device. Furthermore, the size of the energy gap between the first and the second reduction potential differs between different compounds as shown in Table 1, making a strict control of the voltage applied to the individual compounds even more crucial.

The examples for anodic electrochromic compounds in Table 2 show that a similar application of voltage control can be used with these dyes as for the cathodic electrochromic compounds.

The electrochromic compounds in Table 1 show furthermore individual differences between the first reduction potential for the dissolved compound, and for the compound absorbed onto electrodes. This difference can range from negligible (Ex. 3, 5) to significant (Ex. 6). Likewise, changes in redox potential can be expected if the electrolyte is varied (ref. Table 2). It is therefore necessary to determine the redox behaviour of the electrochromic compound for the exact device (incl. electrolyte, electrode material), which is to be controlled.

Consider now the case where segment (1204) is composed of 1-(2-Phosphonoethyl)-1'-(4-phosphonomethylphenyl)-4,4'-bipyridinium dichloride adsorbed on TiO2, and segments (1203) composed of 1,1'-[1,2-phenylenebis(methylene)]bis[1'-(2-phosphonoethyl)-4,4'-bipyridinium]tetrachloride adsorbed on TiO2. In legacy systems, the same feeding structure (that is conductive track and conductor) would be used. Because the ohmic losses would be the same, the segment (1204) with 1-(2-phosphonoethyl)-1% (4-phosphonomethylphenyl)-4,4'-bipyridinium dichloride would color ahead of the segment (1203) with 1,1'-[1,2-phenylenebis(methylene)] bis[1'-(2-phosphonoethyl)-4,4'-bipyridinium]tetrachloride. This would be inappropriate for many designs. The current invention removes this limitations by allowing a higher rate of charges to move to the segment (1203) with 1,1'-[1,2-phenylenebis(methylene)]bis[1'-(2-phosphonoethyl)-4,4'-bipyridinium]tetrachloride, thus equilibrating the charging time and thus coloring effect.

Figure 14:
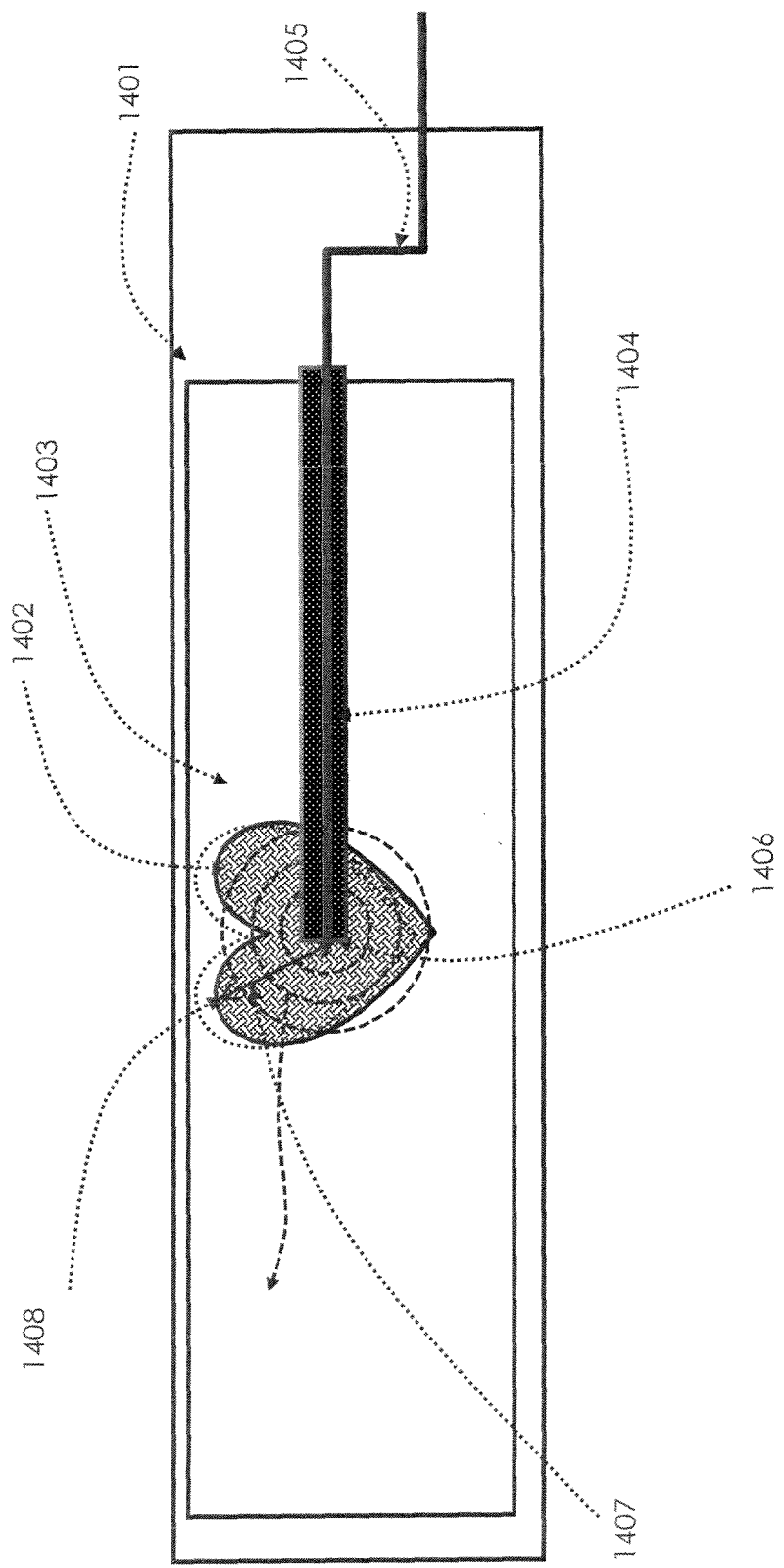
FIG. 14 schematically represents an exemplary display device of the present invention having charge injection points for the current entering a working electrode at the center of the display device.

In an embodiment illustrated in FIG. 14, the disclosure provides for a device having multiple charge injection points for multiple coloring segments. This is possible because, as the heterogeneous conductor areas are printed below the opacifier, these conductor areas can consist of different materials each with different electrical characteristics. This structure provides important improvements, for example when the coloring composition is a viologen. It is important to recall that when using viologen compounds, there are two coloring thresholds to consider. The first one corresponds to typically the transition from a colorless to a colored state and is typically reversible. The second threshold corresponds to a second transition from one colored state to another. This transition is generally irreversible. The current invention reduces the distance between feeding point of a segment and the vertexes of the segment. By thus doing, it reduces the ohmic losses present when driving a specific image. The maximum ohmic losses sustainable by a viologen born material are the difference between first and second coloring threshold. This invention thus allows larger images to be colored without risking driving the viologen in the second reduction.

Figure 13:
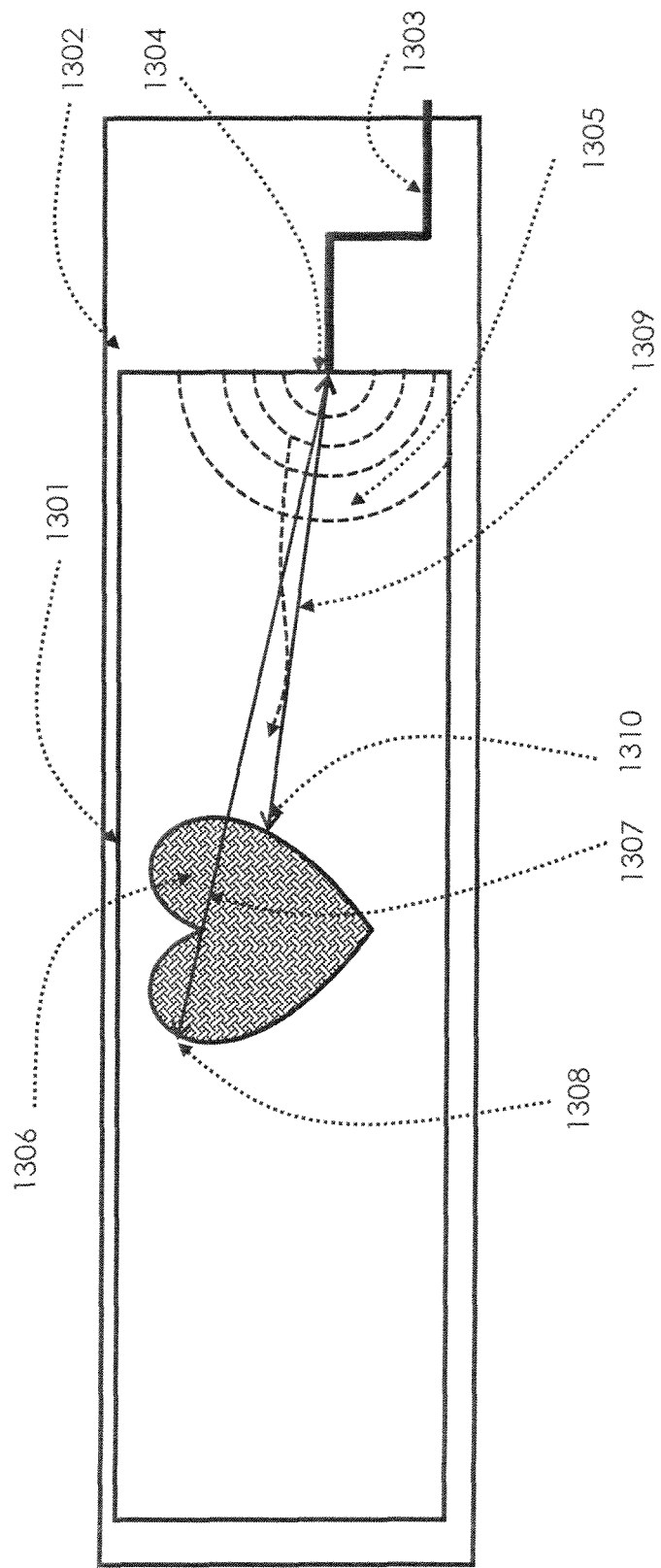
FIG. 13 schematically represents the impact of charge injection on the coloring effect for an exemplary prior art system.

FIG. 13 illustrates the impact of bringing charges to the working electrode through its side. This is a legacy design illustrative of the state of the art before this invention. Here, the innermost layers of a working electrode are illustrated. The display is shown from the perspective of the separator. We see features that are hidden from the end user who will be viewing the structure from its opposite side. A dashed line illustrates the patterned image seen by the viewer.

In a traditional SEG on substrate working electrode, a homogeneous conductive layer (1301) is applied to nearly all or the entirety of the substrate (1302). A conductive wire or track (1303) is attached or deposited to the conductive layer at a charging point (1304). When charges are applied (or removed), they diffuse as a wave (1305). This results in a slow coloring of the icon (1306) on the display from its side, creating a wipe effect. It is important to note, the ohmic losses from the point of injection to the icon might be elevated. This results in increased voltage needing to be applied to the display to reach a specific switching speed. Consider the distance (1307) between the charge injection point (1304) and the part of the coloring area furthest from it (1308) as well the distance (1309) between the charge injection point (1304) and the part of the coloring area the closest to it (1310). The ohmic losses along (1309) and (1307) can be quite large and quite different (ohmic losses along (1307) are greater than along (1309)). To color (1308), the voltage must be such that if the coloring potential of the chromogen is $E_1c$, the Voltage (1308)>$E_1c$. The voltage at location (1308) is equal to the voltage applied at location (1304) minus the ohmic losses along (1307), namely L(1307). Thus the coloring equation (at steady state) becomes V(1304)-L(1307)>E1c or V(1304)>E1c+L(1307). This means that for a given voltage source (say a battery), there is a maximum distance from edge of the display to the coloring image. Lower voltage batteries are typically less expensive than higher voltage batteries. This means for a given voltage, there is a maximum distance between edge of display and coloring image. To ensure proper operation of the display, we must ensure that no location is exposed to a voltage higher than the second reduction $E_2c$. The voltage will be highest at V(1310). V(1310)<$E_2c$ ensures that no part of the image is moved to the second transition. Therefore, V(1310)=V(1304)-L(1309)<$E_2c$ and V(1304)<$E_2c$+L(1309).

A design will operate properly is $E_1c$+L(1307)<V(1340)<$E_2c$+L(1309). This equation shows the inherent limitations of a legacy design, namely L(1307)-L(1309)<$E_2c$-$E_1c$. This means that in legacy designs, for a given chromic material, there is a maximum image dimension that can be supported, regardless of the position of the image within the display.

One of the most effective chromic materials is a film build from nanoparticles on which chromogens are attached (See Bonhote et al. U.S. Pat. No. 6,734,305). Early manufacturing of structures by applicant using this class of chromic material was on glass substrate that can sustain drying temperature of up to 300° C. To enable printed electronics on substrate such as paper, PET and PEN, a lower drying temperature has to be used. One of the impacts of lowering of manufacturing temperature has been a significant decrease in the conductivity of the chromic materials (films built from nano-particles such as ITO, FTO, $TiO_2$, and AZO do not conduct as well as they do at higher temperatures). This means that ohmic losses across a coloring (or SEG) layer will be larger than for devices manufactured at high temperature. This results in smaller devices being reusable. This is true because one cannot risk overdriving the edge of a display in order to color the center of a display.

The introduction of a heterogeneous system of conductors allows the charge injection point for the current entering a working electrode to be in center of the design rather than the display edge. This is possible because internal conductors will be hidden from the user by the opacifier layer applied to the substrate (or the top of the design for SEP as substrate and COM on substrate architectures). This embodiment of the current invention is illustrated in FIG. 14. The display is shown from the perspective of the separator. We see features that are hidden from the end user who will be viewing the structure from its opposite side. The patterned image as seen by the viewer is illustrated by a dashed line. It is meant to illustrate the impact of the relative locations of the positive image and the charge injection point. In this embodiment, on the substrate (1401) the chromic layer (1402) is patterned. A conductive layer (1403) is then applied. A dense passivator (1404) is then deposited on the conductor and chromic layers. A conductive track (1405) deposited, thus allowing the charge inject point (1406) to be located over the icon (preferably at near the center of the structure). When charges are applied (or removed), they diffuse as a wave. Moreover, the ohmic losses from the point of injection to the icon will be reduced compared to legacy side feed designs. This is true because the maximum distance (1407) to be covered between the charge injection point (1406) and the point the furthest away (1408) from the charge injection point is smaller than what can be achieved by a legacy design for the same image (ref. FIG. 13). The maximum size the display can have is set by the equation relating the ohmic loss L (1407) to be less than $E_2c-E_1c$ where E2c and $E_1c$ are, respectively, the second transition and the first transition potentials.

This embodiment enables a new range of large designs. Because the conductive track to the chromic layer is formed from a conductor material having high conductivity (where the choice is not limited by the conductor having to transparent), the ohmic losses will be reduced. Because the ohmic losses are reduced, switching speed is also improved compared to legacy designs. Because the passivator allows the co-location of a charge injection point with the image being displayed, artifacts such as wipe effects are eliminated or nearly eliminated. Iris effects are now a possibility. Because the passivator layer can cover multiple working electrodes, it is uniquely suited to be used to align the switching across chromic layers with different characteristics as well as passive matrix designs. The enablement by this invention of thicker conductive tracks allows the creation of tracks that are more conductive and thus improves switching and bleaching speeds. It enables designs with more than one injection point per colored area.

FIG. 15 illustrates an embodiment of the printing of an electrochromic display with advanced electrodes. There are variations on the printing order for different embodiments. A transparent substrate (1501) is chosen as the basis of the construction. The preferred embodiment uses PET, heat stabilized PET, polycarbonate or PEN substrate, most notably Dupont-Teijin Melinex ST505. The opacifier layer (1502) is deposited and dried onto (1501). Then, the coloring layer (1503) is printed and dried. It is followed by the conductive layer (1504) also printed and dried. The conductive track (1505) is printed and dried next. In one embodiment, the conductor track (1505) extends beyond the display itself. The passivator (1506) is printed and dried next. The separator (1507) is then printed and dried. The capacitive (1508) component of the counter electrode is printed and dried. The counter electrode conductive track (1509) is then printed and dried. It extends beyond the limits of the display. An electrolyte is then applied followed by a laminate seal. In one embodiment, a self-sealing electrolyte (1510) is then applied on top the display structure and dried.

Figure 16A:
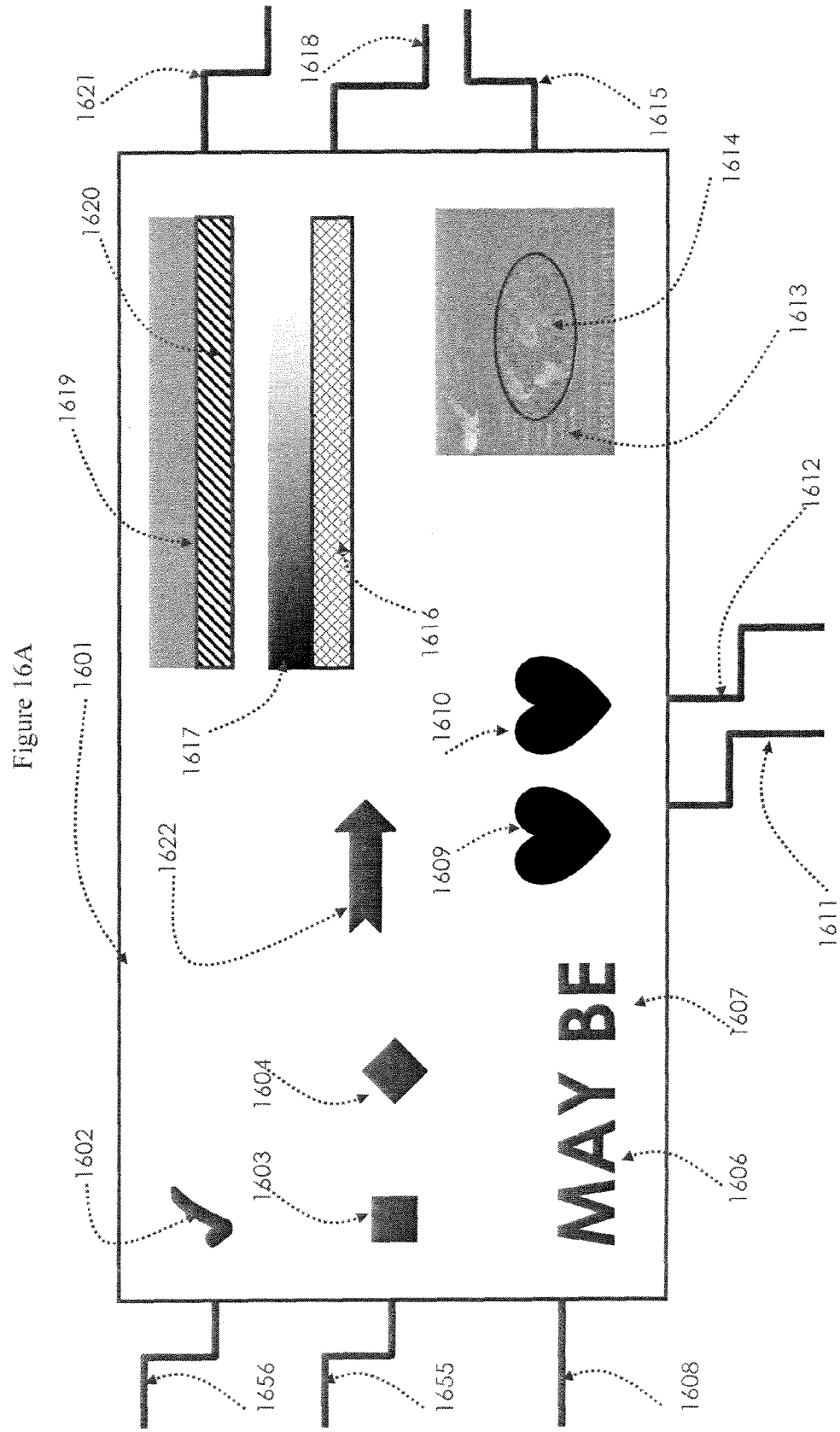
FIG. 16A schematically represents the top view of an exemplary coloring electrode of the present invention.

FIGS. 16A through D present an embodiment of a multiple functional design enabled by the current invention. FIG. 16A shows the top view of the display seen through its transparent substrate (1601). A contiguous indicator (1602) is controlled by charges moving across conductive track (1603). The pair of contiguous indicators (1603) and (1604) are both controlled by the conductive track (1605). The pair of discontinuous indicators (1606) and (1607) are controlled by the conductive track (1608). The display supports two coloring areas (1609) and (1610) that are controlled through the conductive tracks (1611) and (1612) respectively. A hologram (1613) is printed on the transparent substrate. This hologram can be printed on the outside or on the inside of the display. The hologram has a semitransparent area (1614). It is controlled by the conductive track (1615). The display includes a color shifting area (1616) adjacent to a reference print (1617). This color shifting area is controlled by conductive track (1618). Two layers with security features are also present in the display, namely (1619) and (1610). Their effect is controlled by conductive track (1621). A RF power icon is also part of the display. It is controlled by the application of RF field through a reader or equivalent system (not shown).

Figure 16B:
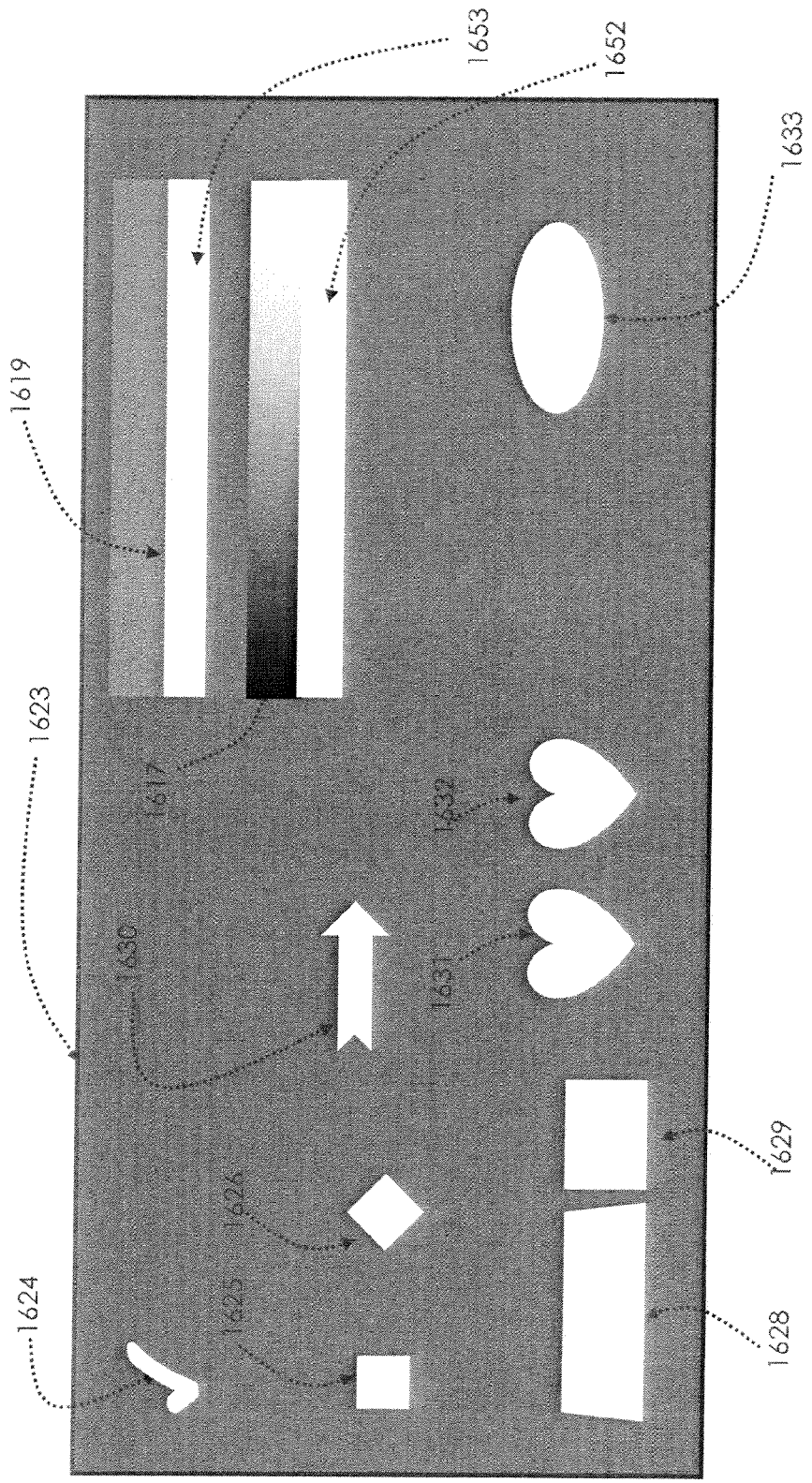
FIG. 16B schematically represents the opacifier layer of the display device illustrated in FIG. 16A.

FIG. 16B shows the opacifier layer directly underneath the transparent substrate. It hides many details of the structure to the end user. The gap (1624) matches exactly the image shown to the end user. The gaps (1625) and (1626) match exactly the images (1603) and (1604) showed to the end user. Two opacifier holes (1628) and (1629) are larger than the images shown to the end user. The opacifier hole (1631) matches exactly the image (1609) to be presented to the end user. The opacifier hole (1632) matches exactly the image (1610) to be presented to the end user. The opacifier hole (1633) matches exactly underneath the area (1614) of the hologram. The reference color strip (1617) if deposited on the inside of the substrate includes the different colors that can be achieved by (1616) (along with optional additional information that can be used for verification). It is adjacent to the hole (1652), which matches exactly the area of (1616). Security taggants are mixed with the opacifier material (1619). This layer can be semi transparent or opaque. The hole (1653) gives a direct view to the chromic layer (1620) below. The opacifier also has a hole (1630) aligned with image (1622).

FIG. 16C show the chromic layers of the display where different chromic areas are present, realized with a multitude of different materials. The contiguous indicator 1602 matches exactly the area seen by the end user. The chromic layer (1635) is a single contiguous layer rendering items (1603) and (1604). The negative of the passivator basically creates these two images. The chromic layer can be deposited with limited requirements of tight alignment. With respect to chromic layers (1606) and (1607), they must match exactly the image seen by the end user as the opacifier placed in front of it does not create the image. A single contiguous chromic layer (1637) provides the coloring of segments (1609) and (1610). Because it does not define the image area (the holes 1631 and 1632 do), it can be bigger than the image shown. In this embodiment, this chromic layer happens to be using an oxidative chromogen. A chromic layer (1638) is patterned over the area (1633). This allows the hologram seen by the end user to offer static optical effects as well as dynamic effects controlled by electronics. The chromic layer (1638) matches exactly the image shown to the end user. Chromic layer (1616) uses a polychromic material such as the ones discussed by Figueiredo et al. in "Photoinduced electron transfer between cytochrome c and a novel 1,4,5,8-naphthalenetetracarboxylic", published in Journal of Photochemistry and Photobiology B: Biology 79 (2005) 1-9. Different amount of charging will result in different colors. Chromic layer (1620) is patterned to be seen through the hole (1653) as well as part of the security print (1619). The chromic layer material also includes security taggants. Chromic layer (1622) pattern is aligned with hole (1630).

Figure 16D:
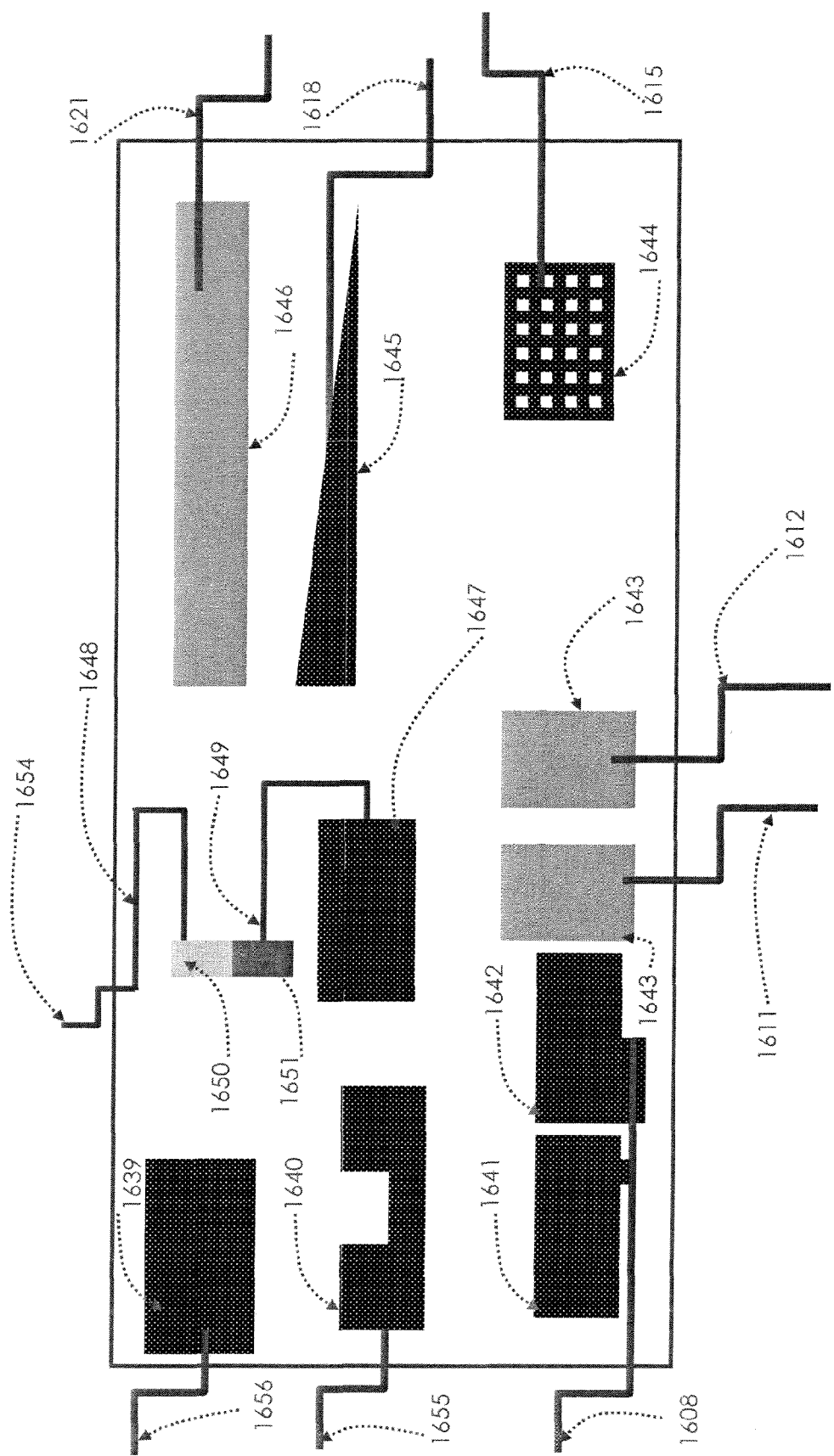
FIG. 16D schematically represents the conductor layer, conductor tracks and charge injection points of the display device illustrated in FIG. 16A.

FIG. 16D shows the heterogeneous conductive layers supporting the chromic areas shown in FIG. 16C. Conductive layer (1639) is larger than chromic layer (1602), allowing thus for misalignments during the manufacturing process. Conductive layer (1640) is positioned with the non-patterned area (1635). It does not cover the entire area of the chromic layer to save costs, but ensures that charges are properly conducted underneath (1603) and (1604) general area. Two separate conductive layers (1641) and (1642) are used to bring charges from conductive track (1608) to the chromic layers (1606) and (1607). In this design, chromic layers (1602), (1603), and (1604) are using reductive chromogens. Two separate conductive layer (two separate layers or two separate layer areas) (1643) connected to conductive track (1611) and (1612) are patterned to fit over (1631) and (1632). Because of the difference in lateral conductivity between the materials in (1637) vs. (1643)—the lateral conductivity of (1637) is (much) lower than that of (1643)—layers (1643) are able to control the coloring of segments (1609) and (1610) even though they are realized using a single chromic layer (1637). The conductive grid (1644) brings charges from the conductive track (1615) to the chromic layer (1638), providing for the control of the hologram dynamic component. To facilitate the generation of different colors, the conductive layer (1645) is patterned in a form of a triangle. It is connected with conductive track (1618). The color shifting effect can be achieved with many other shapes of conductive layers. Conductive layer (1646) connected to conductive track (1621) brings charge to the chromic layer (1620).

A heterogeneous conductive layer allows the powering of chromic layer (1622) from RF field. The antenna (1648) extracts energy from RF field. It is connected in series with layer (1650). Layer (1650) is a patterned p-type semiconductor material. Layer (1651) is a patterned n-type semiconductor material. Together, they form a diode. This diode rectifies the signal extracted by the antenna and conducts electrons to the conductive layer (1647) placed beneath segment (1622). The other end (1654) of the antenna is connected to the counter electrode (not shown).

It should be noted that the conductive areas (1645), (1646), (1650), and (1651) are using material different from the areas (1639)-(1642), (1644), and (1647). It should be noted that the conductive tracks (1649) and (1648) do not have to use the same material or deposition method or thickness or width as conductive tracks (1603), (1605) and (1608). Track (1655) brings charges to (1640). Track (1656) brings charges to (1639).

B. Material Composition

The present disclosure describes several embodiments of display devices based on this primary design feature—the conductor layer is not placed between the viewer and the coloring layer. For each embodiment described herein or shown in FIGS. 3-16C, the coloring electrode contains coloring area (or coloring layer interchangeably), conductive area (or conductive layer interchangeably), opacifier layer, separator layer and optionally a passivator layer. The compositions used to generate these layers are described below.

Substrate Material:

The substrate material used for the display embodiments of the present invention include flexible material such as PET, PETG, PEN, thin glass, bendable glass, or any other transparent material.

Conductor Layer:

The present invention provides for a novel coloring electrode which includes connected conductor system formed from one or more heterogeneous conductive layers and a coloring layer. As discussed above, conductor heterogeneity comprises variations in one or more of: conductor material composition; conductor area dimension; conductor area pattern; conductor area grid design, and combinations thereof.

Variation in conductor material composition is achieved by using a variety of conductor compositions including transparent conductors such as ITO and non-transparent conductors such as metal, semiconductor, or conductive polymers. Exemplary semiconductor compositions include doped silicon, doped Germanium and pentacene. Exemplary conductor polymer include polyaniline, polyacetylene, polypyrrole, polythiophene, polyphenylene, polyphenylene vinylene, polyphenylene sulfide, polyphenyldiamine, poly(N,N' diphenyl(benzidine)) and poly(3,4-ethylenedioxythiophene)poly(styrenesulfonate) (PEDOT:PSS) even though PEDOT, PEDOT:PSS display electrochromic property of their own.

The current invention also allows the use of non-transparent conductor material. In one embodiment, the non-transparent conductor material includes carbon nanotubes and specially formulated graphene based inks. In another embodiment, the non-transparent conductor material includes silver, copper or gold conductor material which can be used inside the working electrode. As illustrated in FIG. 8, the passivator layer may insulate the conductor layer from electrolyte, allowing the use in the same display of materials that were heretofore considered incompatible such as silver conductor in combination with acidic electrolyte solution.

Coloring Composition:

The coloring layer or area composition can include any composition that produced color upon the application or removal of charge. In one embodiment, the coloring layer is composed of electrochromic compounds attached to nano-sized particles of metals, conducting metal oxides, or semiconducting metal oxides. Said nanosized particles can also be a composite, i.e. made of any nanostructured material coated with metals, conducting metal oxides or semiconducting metal oxides, etc.

The nanosized particles of conducting metal oxide include wide band gap metal oxides. Representative examples include one or more of the following oxides: $SnO_2$ doped with F, Cl, Sb, N, P, As, Nb, V and/or B; ZnO doped with Al, In, Ga, B, F, Si, Ge, Ti, Zr or Hf; $In_2O_3$ doped with Sn; CdO; ternary oxides $ZnSnO_3$, $Zn_2In_2O_5$, $In_4Sn_3O_{12}$, $GaInO_3$ or $MgIn_2O_4$; $TiO_2$ doped with F, Cl, Sb, N, P, As Nb, V and/or B; $Fe_2O_3$ doped with Sb; and $Fe_2O_3$/Sb or $SnO_2$/Sb systems. The nano-sized particles of semiconducting metal oxide includes oxides including one or more of the following metals: titanium, zirconium, hafnium, chromium, molybdenum, tungsten, vanadium, niobium, tantalum, silver, zinc, strontium, iron ($Fe^{2+}$ or $Fe^{3+}$), nickel and a perovskite of each of the proceeding metals. In one embodiment, the nanoporous, nanocrystalline metal oxide includes $TiO_2$. In another embodiment, the nanoporous, nanocrystalline metal oxide includes indinium doped tin oxide. In yet another embodiment, the nanoporous, nanocrystalline metal oxide includes ZnO. In such embodiments, the metal or metal oxide can also be a long fibrous metal oxide of a nanowire structure or a nanotube structure.

In the case of composite nanosized particles, the nanostructured material can be selected from any conducting, semiconducting or non-conducting material. Representative examples include polymethylmethacrylate (PMMA), cellulose, polycarbonate, polystyrene, titanium dioxide, silicon dioxide, zinc oxide, alumina, zeolite, Sn doped indium oxide (ITO), or antimony doped tin oxide (ATO).

The electrochromic compounds can include compounds which change color upon oxidation, change color upon reduction or combinations thereof. In one embodiment, the coloring composition has a first $E_{1/2}$ reduction potential ranging from −0.37 to −0.65 volts. Representative coloring compositions are tabulated in Table 1. In another embodiment, the coloring composition has a first $E_{112}$ oxidation potential ranging from 0.8 to 1.2 volts. Representative coloring compositions are tabulated in Table 2.

In another embodiment, the electrochromic compounds can exhibit color changes of colorless to colored, colored to colored or colored to colorless transitions.

In still other embodiments, the compounds are not particularly limited and can be appropriately selected depending on the intended use; examples thereof include known electrochromic compounds such as viologen compounds, extended viologen compounds; p-phenylenediamine or benzidine compounds; tetrathiafulvalene compounds; styryl compounds; phenothiazine, phenoxazine or phenothiazine compounds; anthraquinone compounds; pyrazolone compounds; fluoran compounds; imidazole, oxazole, thiazole compounds; triarylamine compounds; and phthalocyanine compounds. In one embodiment, the electrochromic compounds include viologen compounds. Examples of electrochromic compounds can be found in U.S. Patent Application Publ. No. 2006/0110638.

Preferred electrochromic compounds have the general formulas of I-V, X-XII, XV-XXI:

In one embodiment, the electrochromic compound has the general formula I

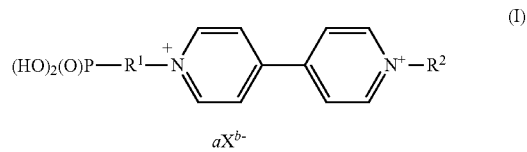

(I)

wherein $R^1$ is —$(CH_2)_m$- wherein m is zero or an integer from 1 to 10; or aryl radical or heteroaryl radical having up to 14 carbon atoms; or branched-chain alkyl radical or alkenyl radical, or cycloalkyl radical, each having up to 10 carbon atoms; the aryl radical, heteroaryl radical, branched alkyl radical, branched alkenyl radical or cycloalkyl radical optionally being attached to the —$P(O)(OH)_2$ group via a —$(CH_2)_n$-linkage, wherein n is zero or an integer from 1 to 10, wherein the aryl radical is independently selected from an anthryl radical, phenanthryl radical, phenyl radical and naphthyl radical; it also being possible for the aryl radical, heteroaryl radical, branched alkyl radical, branched alkenyl radical or cycloalkyl radical to be optionally substituted by one or more of the following substituents which may be the same or different: lower alkyl, lower alkenyl, phenyl-lower alkyl, diphenyl-lower alkyl, phenyl, naphthyl, phenoxy, lower alkanoyloxy, halogen, amino, cyano, nitro, lower alkylamino, di-lower alkylamino, phenylamino, lower alkanoylamino, benzoylamino; lower alkylsulfonylamino, phenylsulfonylamino, lower alkanoyl, benzoyl, carboxy, lower alkoxycarbonyl, carbamoyl, N-lower alkylcarbamoyl, N,N-di-lower alkylcarbamoyl, ureido, N-lower alkylureido, lower alkyl sulfonyl; phenylsulfonyl; lower alkylsulfinyl; phenylsulfinyl; lower alkyl which is substituted by hydroxy, lower alkoxy, amino, lower alkylamino, di-lower alkylamino, halogen, carboxy or lower alkoxycarbonyl; lower alkoxy which is substituted by hydroxy, lower alkoxy, amino, lower alkylamino, di-lower alkylamino, halogen, carboxy or lower alkoxycarbonyl; $C_3$-$C_7$-alkoxy; and/or bivalent methylenedioxy; it being possible for all phenyl groups mentioned as such or in composed radicals (such as benzoyl, phenylamino etc.) to be unsubstituted or substituted by lower alkyl, lower alkoxy, halogen, hydroxy and/or nitro; and $R^2$ is $R^3R^4$, wherein $R^3$—$(CH_2)_p$— wherein p is zero or an integer from 1 to 10; and $R^4$ is —$P(O)(OH)_2$; or aryl radical or heteroaryl radical having up to 14 carbon atoms; or branched-chain alkyl radical or alkenyl radical, or cycloalkyl radical, each having up to 10 carbon atoms, wherein the aryl radical is independently selected from an anthryl radical, phenanthryl radical, phenyl radical and naphthyl radical, it being possible for the aryl radical, heteroaryl radical, branched alkyl radical, branched alkenyl radical or cycloalkyl radical to be unsubstituted or substituted by one or more of the substituents given in the definition of $R^1$; and $X^{b-}$ is an anion, a and b are integers with values such as a multiplied by b is equal to two.

In one such embodiment for Formula I, the structure is limited by the proviso that $R^1$ cannot be —$(CH_2)_m$— where m is 2 or 3, when $R^2$ is —$(CH_2)_2$—$P(O)(OH)_2$; and $R^1$ cannot be —$(CH_2)_m$— where m is 2 when $R^2$ is phenyl, benzyl or 2,4-dinitrophenyl.

In another such embodiment of a compound according formula I, $R^1$ is —$(CH_2)_m$— wherein m is 1, 2 or 3; or phenyl which is attached to the —$P(O)(OH)_2$ group via $(CH_2)_n$— in the para-position of the phenyl ring, wherein n is 1 or 2; $R^2$ is $R^3R^4$ wherein $R^3$ is —$(CH_2)_p$ wherein p is zero, 1, 2 or 3, and $R^4$ is unsubstituted phenyl or naphthyl, or phenyl or naphthyl which is mono-, di- or trisubstituted by $C_{1-4}$-alkyl, halogen, cyano, nitro, phenoxy or benzoyl; a is 1; and $X^{b-}$ is Cl⁻, Br⁻, $ClO_4^-$ $PF_6^-$, $BF_4^-$, $C_2F_6NO_4S_2^-$ or $CF_3SO_3^-$, especially Cl⁻ or $PF_6^-$. In one such embodiment for Formula I, the structure is limited by the proviso that $R^1$ cannot be —$(CH_2)_m$— where m is 2 or 3, when $R^2$ is —$(CH_2)_2$—$P(O)(OH)_2$; and $R^1$ cannot be —$(CH_2)_m$— where m is 2 when $R^2$ is phenyl, benzyl or 2,4-dinitrophenyl.

In still another such embodiment of compound according to claim 1, $R^1$ is phenyl which is attached to the —$P(O)(OH)_2$ group via —$(CH_2)_n$— in the para-position of the phenyl ring, wherein n is 1 or 2; $R^2$ is $R^3R^4$ wherein $R^3$ is —$(CH_2)_p$— wherein p is zero, 1, 2 or 3 and $R^4$ is —$P(O)(OH)_2$; a is 1; and $X^{b-}$ is Cl⁻, Br⁻, $ClO_4^-$ $PF_6^-$, $BF_4^-$, $C_2F_6NO_4S_2^-$ or $CF_3SO_3^-$, especially Cl⁻ or $PF_6^-$.

Exemplary embodiments of Formula I include:
1-(3-Phenylpropyl)-1'-(2-phosphonoethyl)-4,4'-bipyridinium dichloride; 1-(3-Phenylpropyl)-1'-(2-phosphonoethyl)-4,4'-bipyridinium bis-hexafluorophosphate; 1-(2-Phosphonoethyl)-1'-(2,4,6-trimethylphenyl)-4,4'-bipyridinium dichloride; 1-(2-Phosphonoethyl)-1'-(2,4,6-trimethylphenyl)-4,4'-bipyridinium bis (hexafluorophosphate); 1-(1-Naphtalenyl)-1'-(2-phosphonoethyl)-4,4'-bipyridinium dichloride; 1-(4-Cyano-1-naphtalenyl)-1'-(2-phosphonoethyl)-4,4'-bipyridinium dichloride; 1-(4-Methylphenyl)-1'-(2-phosphonoethyl)-4,4'-bipyridinium dichloride; 1-(4-Cyanophenyl)-1'-(2-phosphonoethyl)-4,4'-bipyridinium dichloride; 1-(4-Fluorophenyl)-1'-(2-phosphonoethyl)-4,4'-bipyridinium dichloride; 1-(4-Phenoxyphenyl)-1'-(2-phosphonoethyl)-4,4'-bipyridinium dichloride; 1-(4-t-Butylphenyl)-1'-(2-phosphonoethyl)-4,4'-bipyridinium dichloride; 1-(2,6-Dimethylphenyl)-1'-(2-phosphonoethyl)-4,4'-bipyridinium dichloride; 1-(3,5-Dimethylphenyl)-1'-(2-phosphonoethyl)-4,4'-bipyridinium dichloride; 1-(4-Benzoylphenyl)-1'-(2-phosphonoethyl)-4,4'-bipyridinium dichloride; 1-(3-phenylpropyl)-1'-(phosphonomethylphenyl)-4,4'-bipyridinium dichloride; 1-(3-phenylpropyl)-1'-(phosphonomethylphenyl)-4,4'-bipyridinium bis (hexafluorophosphate); 1-(2-Phosphonoethyl)-1'-(phosphonomethylphenyl)-4,4'-bipyridinium dichloride; 1-(2,4-Dinitrophenyl)-1'-(phosphonomethylphenyl)-4,4'-bipyridinium dichloride; 1-(2,4-Dinitrophenyl)-1'-(phosphonomethylphenyl)-4,4'-bipyridinium bis(hexafluorophosphate); 1-(4-Phenoxyphenyl)-1'-(phosphonomethylphenyl)-4,4'-bipyridinium dichloride; 1-(4-Phenoxyphenyl)-1'-(phosphonomethylphenyl)-4,4'-bipyridinium bis (hexafluorophosphate); 1-(4-Fluorophenyl)-1'-(phosphonomethylphenyl)-4,4'-bipyridinium dichloride; 1-(4-Methylphenyl)-1'-(phosphonomethylphenyl)-4,4'-bipyridinium dichloride; 1-Phosphonomethylphenyl-1'-(2,4,6-trimethylphenyl)-4,4'-bipyridinium dichloride; 1-Benzyl-1'-(phosphonomethylphenyl)-4,4'-bipyridinium dichloride; 1-(1-Naphthenyl)-1'-(phosphonomethylphenyl)-4,4'-bipyridinium dichloride; 1-(Phenyl)-1'-(phosphonomethylphenyl)-4,4'-bipyridinium dichloride; 1-(4-Cyanophenyl)-1'-(phosphonomethylphenyl)-4,4'-bipyridinium dichloride; 1-(4-Benzoylphenyl)-1'-(phosphonomethylphenyl)-4,4'-bipyridinium dichloride; 1-[4-(1-Cyanonaphythenyl)]-1'-(phosphonomethylphenyl)-4,4'-bipyridinium dichloride; 1-(2,6-Dimethylphenyl)-1'-(phosphonomethylphenyl)-4,4'-bipyridinium dichloride; 1-(3,5-Dimethylphenyl)-1'-(phosphonomethylphenyl)-4,4'-bipyridinium dichloride; and 1-(2-Phosphonoethyl)-1'-(2,4,6-trimethylphenyl)-4,4'-bipyridinium bis[bis(trifluoromethanesulfonimide)].

In another embodiment, the viologen may be a compound of the general formula II:

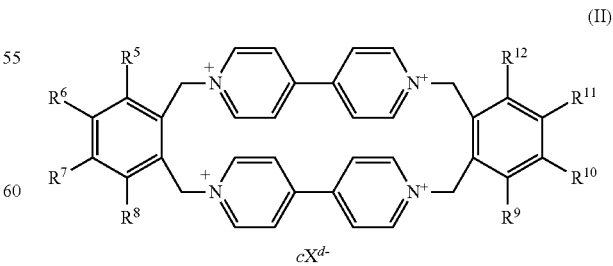

(II)

where $X^{d-}$ is an anion, c and d are integers with values such as c multiplied by d is equal to four and $R^5$-$R^{12}$ are selected from a hydrogen atom, an aliphatic hydrocarbon radical, an ether group, an acyl group, a halogen radical, a cyano group, an ester group, a hydroxy group, an amino group, an amide group, or an aromatic hydrocarbon radical, and at least one or more of $R^5$-$R^{12}$ is functionalized with a group which allows adsorption onto a nanoparticle; preferably, this group is the —P(O)(OH)$_2$ group. In some such embodiments, $R_5$-$R_{12}$ is an aliphatic hydrocarbon having up to 10 carbon atoms.

In yet another embodiment, the viologen may be a compound of the general formulas III or IV:

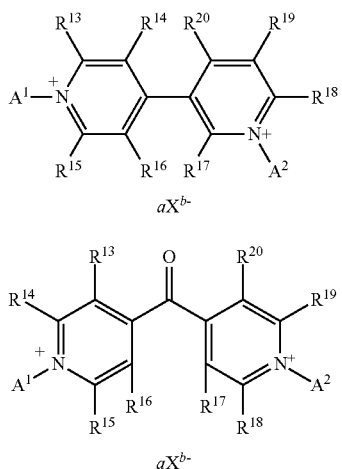

(III)

(IV)

where $X^{b-}$ is an anion, a and b are integers with values such as a multiplied by b is equal to two and $R^{13}$-$R^{20}$ is selected from a hydrogen atom, an aliphatic hydrocarbon radical, an ether group, an acyl group, a halogen radical, a cyano group, an ester group, a hydroxy group, an amino group, an amide group, or an aromatic hydrocarbon radical, and $A^1$ and $A^2$ may be independently selected from an aliphatic hydrocarbon radical, which may be branched or substituted, or an aromatic hydrocarbon radical, and at least one of $A^1$ or $A^2$ is functionalized with a group which allows adsorption onto a nanoparticle; preferably, this group is the —P(O)(OH)$_2$ group. In some embodiments, $R^{13}$-$R^{20}$ is an aliphatic hydrocarbon having up to 10 carbon atoms. In some embodiments, $A^1$ or $A^2$ is an aliphatic hydrocarbon having up to 10 carbon atoms and at least one of $A^1$-$A^2$ is functionalized with the —P(O)(OH)$_2$ group.

A compound of the general formula V:

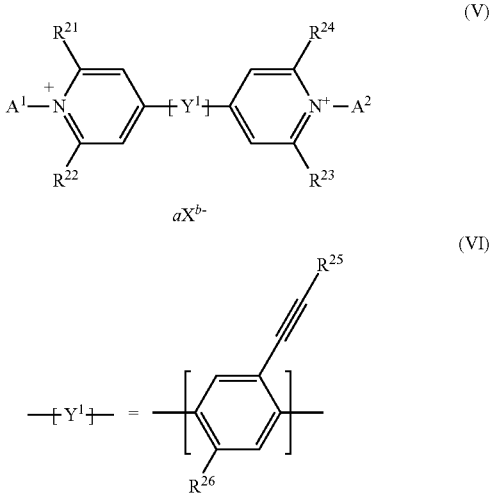

(V)

(VI)

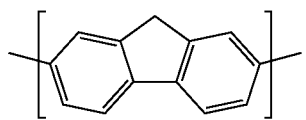

(VII)

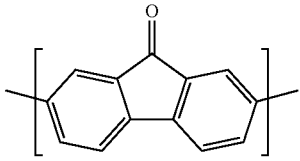

(VIII)

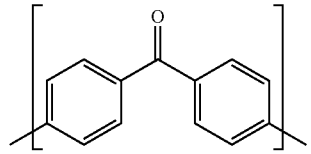

(IX)

where $X^{b-}$ is an anion, a and b are integers with values such as a multiplied by b is equal to two and $R^{21}$-$R^{24}$ are selected from a hydrogen atom, an aliphatic hydrocarbon radical, which may be substituted by a halogen, an ether group, a halogen radical, a cyano group, an amino group, or an amide group; and $A^1$ and $A^2$ may be independently selected from an aliphatic hydrocarbon radical, which may be branched or substituted, or an aromatic hydrocarbon radical, and at least one of $A^1$ or $A^2$ is functionalized with a group which allows adsorption onto a nanoparticle; preferably, this group is the —P(O)(OH)$_2$ group; —[$Y^1$]— is selected from the structures VI-IX where $R^{25}$ is selected from an aliphatic hydrocarbon radical, which may be branched or substituted, or an aromatic hydrocarbon radical, or heterocycle; and $R^{26}$ is selected from an aromatic hydrocarbon radical which has a hydrogen atom, an aliphatic hydrocarbon radical, which may be halogen substituted, an ether group, an acyl group, a halogen radical, a cyano group, an ester group, a hydroxy group, an amino group, an amide group, an aromatic hydrocarbon radical, which may be halogen substituted or a heterocycle radical.

In still yet another embodiment, the viologen may be a compound of the general formula X:

(X)

wherein $X^{b-}$ is an anion, a and b are integers with values such as a multiplied by b is equal to two and $R^{27}$-$R^{30}$ are independently selected from a hydrogen atom, an aliphatic hydrocarbon radical, a fluorine radical, a chlorine radical, or a bromine radical; and $A^1$ and $A^2$ may be independently selected from an aliphatic hydrocarbon radical, which may be branched or substituted, or an aromatic hydrocarbon radical, and at least one of $A^1$ or $A^2$ is functionalized with a group which allows adsorption onto a nanoparticle; preferably, this group is the —P(O)(OH)$_2$ group. In some embodiments, $R^{27}$-$R^{30}$ is an aliphatic hydrocarbon having up to 10 carbon atoms. In some embodiments, $A^1$ or $A^2$ is an aliphatic hydrocarbon having up to 10 carbon atoms and at least one of $A^1$-$A^2$ is functionalized with the —P(O)(OH)$_2$ group.

In still yet another embodiment, the viologen may be a compound of the general formula XI:

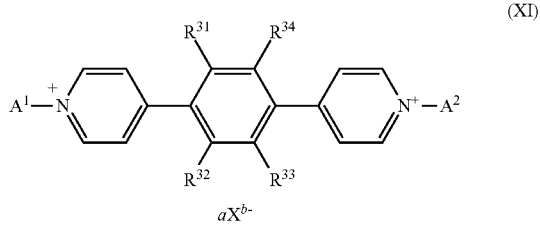

(XI)

wherein $X^{b-}$ is an anion, a and b are integers with values such as a multiplied by b is equal to two and; $R^{31}$-$R^{34}$ are independently selected from a trifluoromethyl group, a cyano group, a hydrogen atom, and an aliphatic hydrocarbon group; wherein $A^1$ and $A^2$ may be independently selected from an aliphatic hydrocarbon radical, which may be branched or substituted, or an aromatic hydrocarbon radical; and at least one of $A^1$ or $A^2$ is functionalized with a group which allows adsorption onto a nanoparticle; preferably, this group is the —P(O)(OH)$_2$ group. In some embodiments, $R^{31}$-$R^{34}$ do not stand for $R^{31}$=$R^{32}$=$R^{33}$=$R^{34}$=trifluoromethyl group. In some embodiments, $R^{31}$-$R^{34}$ is an aliphatic hydrocarbon having up to 10 carbon atoms. In some embodiments, $A^1$ or $A^2$ is an aliphatic hydrocarbon having up to 10 carbon atoms and at least one of $A^1$-$A^2$ is functionalized with the —P(O)(OH)$_2$ group.

In yet another embodiment, the viologen may be a compound of the general formula XII:

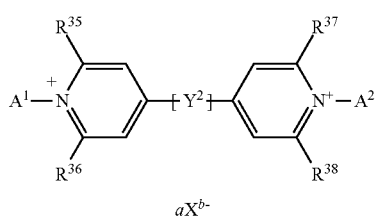

(XII)

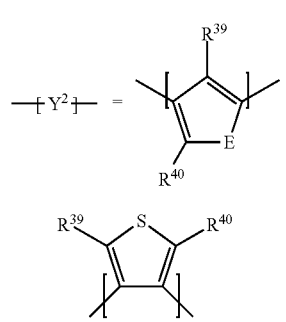

(XIII)

(XIV)

wherein $X^{b-}$ is an anion, a and b are integers with values such as a multiplied by b is equal to two; and E stands for S, O, or N—$R^{41}$; wherein $R^{41}$ stands for the hydrogen atom, the aliphatic hydrocarbon group which may be substituted or branched, or aromatic hydrocarbon group which may be substituted; and $R^{35}$-$R^{40}$ are independently selected from a hydrogen atom, an aliphatic hydrocarbon radical, which may be branched or substituted, or an aromatic hydrocarbon radical, which may be substituted, an ether group, a halogen group, an ester group, or an amide group; and $A^1$ and $A^2$ may be independently selected from an aliphatic hydrocarbon radical, which may be branched or substituted, or an aromatic hydrocarbon radical, and at least one of $A^1$ or $A^2$ is functionalized with a group which allows adsorption onto a nanoparticle; preferably, this group is the —P(O)(OH)$_2$ group. In some embodiments, $R^{35}$-$R^{40}$ is an aliphatic hydrocarbon having up to 10 carbon atoms. In some embodiments, $A^1$ or $A^2$ is an aliphatic hydrocarbon having up to 10 carbon atoms and at least one of $A^1$-$A^2$ is functionalized with the —P(O)(OH)$_2$ group.

In yet another embodiment, the viologen may be a compound of the general formula XV:

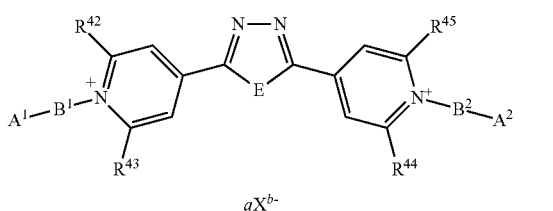

(XV)

wherein $X^{b-}$ is an anion, a and b are integers with values such as a multiplied by b is equal to two; and E stands for S, O or N—$R^{46}$; wherein $R^{46}$ expresses a hydrogen atom, an aliphatic hydrocarbon group, or an aromatic hydrocarbon group; and $R^{42}$-$R^{45}$ are independently selected from a hydrogen atom, an aliphatic hydrocarbon group, an aromatic hydrocarbon group, an ether group, a halogen group, an ester group, or an amide group;

and $B^1$ and $B^2$ are aliphatic hydrocarbon groups; and $A^1$ and $A^2$ are selected from an aliphatic hydrocarbon group, or an aromatic hydrocarbon group, and at least one of $A^1$ or $A^2$ is functionalized with a group which allows adsorption onto a nanoparticle; preferably, this group is the —P(O)(OH)$_2$ group. In some embodiments, E does not stand for O. In some embodiments, $R^{42}$-$R^{45}$ is an aliphatic hydrocarbon having up to 10 carbon atoms. In some embodiments, $A^1$ or $A^2$ is an aliphatic hydrocarbon having up to 10 carbon atoms and at least one of $A^1$-$A^2$ is functionalized with the —P(O)(OH)$_2$ group.

In still yet another embodiment, the viologen may be a compound of the general formulas XVI or XVII:

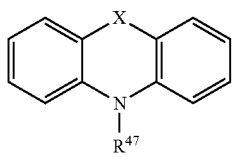

(XVI)

(XVII)

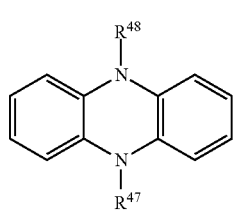

wherein X in formula XVI is S or O; and $R^{47}$-$R^{48}$ are each independently selected from the following:

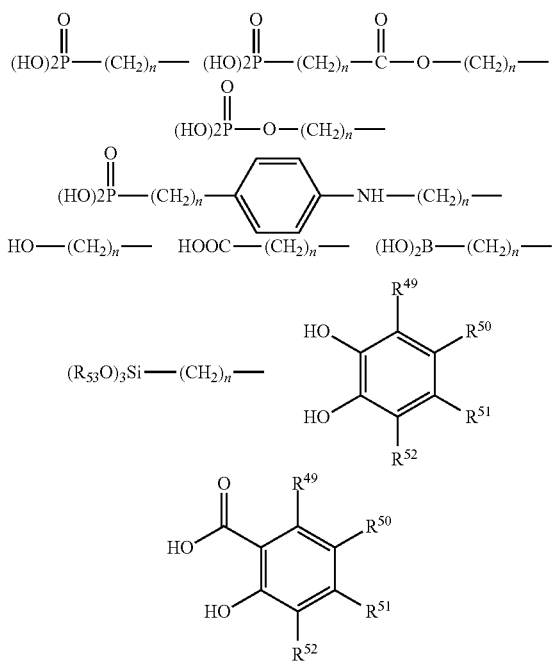

wherein $R^{53}$ is $C_{1-10}$ alkyl; and $R^{49}$-$R^{52}$ are each independently selected from hydrogen; $C_{1-10}$ alkyl; $C_{1-10}$ alkylene; aryl or substituted aryl; halogen, nitro and an alcohol group, with the proviso that one of $R^{49}$-$R^{52}$ is a radical position for connection with the structure of formula XVI or XVII.

In yet another embodiment, the viologen may be a compound of the general formula XVIII:

(XVIII)

wherein $R^{54}$ represents a substituted or unsubstituted aryl group; and
$R^{55}$ and $R^{56}$ each represent a hydrogen atom or a substituent, with the proviso that at least one of $R^{55}$-$R^{56}$ is further substituted with a group which allows adsorption onto a nanoparticle; preferably, this group is the —P(O)(OH)$_2$ group; and X represents >N—$R^{57}$, an oxygen atom or a sulphur atom; wherein $R^{57}$ represents a hydrogen atom or a substituent.

In yet another embodiment, the viologen may be a compound of the general formula XIX-XXI:

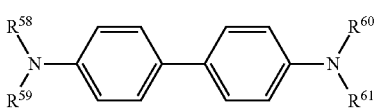

(XIX)

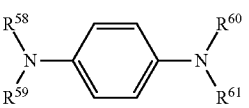

(XX)

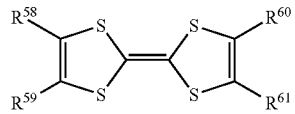

(XXI)

wherein $R^{58}$-$R^{61}$ are each independently selected from hydrogen; $C_{1-10}$ alkyl; $C_{1-10}$ alkylene; aryl or substituted aryl; halogen, nitro and an alcohol group, with the proviso that at least one of $R^{58}$-$R^{61}$ is further substituted with a group which allows adsorption onto a nanoparticle; preferably, this group is the P(O)(OH)$_2$ group.

Opacifier and Passivator Layers:

The compositions used for the opacifier and passivator layers are ionically and electronically insulating material, typically dense and might have a limited number of pinholes. Multiple materials can be used to create graphical effects as part of opacifier or passivator layers, similar to a way a graphic is applied on the outside of a display to produce graphics, text or numbers. The passivator layer and opacifier layer can contain material representative materials such as alkyd resins, epoxy resins, acrylic resins, alkyd-melamine resins, rosin, ester gums (rosin triglycerides), shellac, asphalts, phenolic resins, polystyrenes, slicones, formaldehyde resins, polyamides, polimides, poly(imide-amides), vinyl resins (including polyvinyl acetate and polyvinyl chloride), polyurethanes, polyisocyanates, cellulosic resin (including nitrocelluolose, ethylcellulose, ethylhydroxycellulose, hydroxypropylcellulose), cellulosic esters, perfluorocarbons, including polyvinyldienefluoride, poly(vinyldienefluoride-hexafluoropropylene), polyhexafluoroproylene, polytetrafluoropropylene. All of these are from The Printing Ink Manual, 3rd edition ed. R. H. Leach, R. J. Pierce, Kluwer Academic Publishers, Dordrecht, 1993, ISBN 0-948905-81-6 pp 210-225, 636-671 and are incorporated by reference. As described above, the ability to use color matching is an important means to improving the look and feel of displays. It can be realized by mixing the passivator layer, chromic layers, and opacifier layers with pigment materials such as for example those listed in table 3-5.

TABLE 3

| Material | Color |
| --- | --- |
| Titanium dioxide | White |
| Zinc oxide | White |
| Zirconium oxide | White |
| Cadmium sulfide | Yellow |
| Cadmium selenide | Red |
| Sodium aluminosilicate | Blue |
| Chromium (III) oxide | Green |
| Carbon black | Black |

TABLE 4

| Material | Excitation Wavelength (nm) | Emission Wavelength (nm) |
|---|---|---|
| Lucifer yellow | 425 | 528 |
| NBD | 466 | 539 |
| R-Phycoerythrin (PE) | 480; 565 | 578 |
| PE-Cy5 conjugates | 480; 565; 650 | 670 |
| Red 613 | 480; 565 | 613 |
| Fluorescein | 495 | 519 |
| FluorX | 494 | 520 |
| BODIPY-FL | 503 | 512 |
| TRITC | 547 | 572 |
| X-Rhodamine | 570 | 576 |
| Lissamine Rhodamine B | 570 | 590 |
| PerCP | 490 | 675 |
| Texas Red | 589 | 615 |
| Allophycocyanin (APC) | 650 | 660 |
| TruRed | 490, 675 | 695 |
| Alexa Fluor | 430 | 545 |
| Alexa Fluor | 494 | 517 |
| Alexa Fluor 532 | 530 | 555 |
| Alexa Fluor 546 | 556 | 573 |
| Alexa Fluor 555 | 556 | 573 |
| Alexa Fluor 568 | 578 | 603 |
| Alexa Fluor 594 | 590 | 617 |
| Alexa Fluor 633 | 621 | 639 |
| Alexa Fluor 647 | 650 | 668 |
| Alexa Fluor 660 | 663 | 690 |
| Alexa Fluor 680 | 679 | 702 |
| Alexa Fluor 700 | 696 | 719 |
| Alexa Fluor 750 | 752 | 779 |
| Cy2 | 489 | 506 |
| Cy2 | (512); 550 | 570; (615) |

TABLE 5

| Material | Type of Phosphor | Persistence |
|---|---|---|
| ZnS:Ag + (Zn,Cd)S:Ag(P4) | white | |
| $Y_2O_2S$:Eu + $Fe_2O_3$ (P22R) | red | |
| ZnS:Cu,Al (P22G) | green | |
| ZnS:Ag + Co-on-$Al_2O_3$ (P22B) | blue | |
| $Zn_2SiO_4$:Mn (P1, GJ) | yellowish-green (525 nm) | 1-100 ms persistence |
| ZnS:Ag,Cl or ZnS:Zn (P11, BE) | blue (460 nm) | 0.01-1 ms persistence |
| (KF,$MgF_2$):Mn (P19, LF) | yellow (590 nm) | |
| (KF,$MgF_2$):Mn (P26, LC) | orange (595 nm) | over 1 second persistence |
| (Zn,Cd)S:Ag or (Zn,Cd)S:Cu (P20,KA) | yellow-green | 1-100 ms persistence |
| ZnO:Zn (P24, GE) | green (505 nm) | 1-10 us persistence |
| (Zn,Cd)S:Cu,Cl (P28,KE) | yellow | |
| ZnS:Cu or ZnS:Cu,Ag (P31, GH) | yellowish-green | 0.01-1 ms persistence |
| $MgF_2$:Mn (P33, LD) | orange (590 nm) | over 1 second persistence |
| Zn,Mg)$F_2$:Mn (P38, LK) | orange (590 nm) | |
| $Zn_2SiO_4$:Mn,As (P39, GR) | green (525 nm) | |
| ZnS:Ag + (Zn,Cd)S:Cu (P40, GA) | white | |
| $Gd_2O_2S$:Tb (P43, GY) | yellow-green (545) | |
| $Y_2O_2S$:Tb (P45, WB) | white (545 nm) | |
| $Y_2O_2S$:Tb | green (545 nm) | |
| $Y_3Al_5O_{12}$:Ce (P46, KG) | green (530 nm) | |
| $Y_3(Al,Ga)_5O_{12}$:Ce | green (520 nm) | |

Electrolyte:

The electrolyte may be a molten salt, ionic liquid, solid polymer, or gel. The electrolyte used in the present embodiment is preferably in liquid form and preferably comprises at least one electrochemically inert salt in solution in a solvent. Examples of suitable salts include lithium salts, such as lithium perchlorate (LiClO4), lithium tetrafluoroborate (LiBF4), lithium iodide (LI), lithium hexafluorophosphate (LiPF6), lithium hexafluoroarsenate (LiAsF6), lithium styrylsulfonate (LiSS), lithium triflate (LiCF3SO3), lithium bis(trifluoromethanesulfonyl)imide ithium methacrylate, lithium halides other than LI, such as lithium chloride (LiCl), lithium bromide (LiBr) and the like, lithium trifluoroacetate (CF3COOLi) and combinations thereof. Of these, LiClO4 or combinations of LiClO4 and LiBF4 are preferred. These sources of alkali metal ions may be present in the electrolyte in a concentration of about 0.01M to 1.0M, with a concentration of about 0.05M to 0.2M being preferred.

Suitable solvents may be selected from acetonitrile, 3-hydroxypropionitrile, methoxypropionitrile, 3-ethoxypropionitrile, 2-acetylbutyrolactone, propylene carbonate, ethylene carbonate, glycerine carbonate, tetramethylene sulfone, cyanoethyl sucrose, γ-butyrolactone, 2-methylglutaronitrile, N,N'-dimethylformamide, 3-methylsulfolane, glutaronitrile, 3,3'-oxydipropionitrile, methylethyl ketone, cyclopentanone, cyclohexanone, benzoyl acetone, 4-hydroxy-4-methyl-2-pentanone, acetophenone, 2-methoxyethyl ether, triethylene glycol dimethyl ether, 4-ethenyl-1,3-dioxalane-2-one, 1,2-butylene carbonate, glycidyl ether carbonates (such as those commercially available from Texaco Chemical Company, Austin, Tex.) and combinations thereof, preferred of which include γ-butyrolactone, propylene carbonate, 1,2-butylene carbonate, the combination of tetramethylene sulfone and propylene carbonate and the combination of 1,2-butylene carbonate and propylene carbonate. γ-Butyrolactone is particularly preferred.

Preferable monomers/polymers include, but are not restricted to methylmethacrylate, tert-butyl methacrylate, p-tert-butoxystryrene, acrylonitrile, ethylene oxide and vinylacetate.

Preferable ionic liquids include, but are not limited to Ethanolammonium formate, 1-Ethyl-3-methyl-imidazolium dicyanamide, 1-Ethyl-3-methyl-imidazolium methanesulfonate, 1-Ethyl-3-methyl-imidazolium nitrate, 1-Ethyl-3-methylimidazolium tetrafluoroborate, 1-Ethyl-3-methyl-imidazolium ethylsulfate, 1-Butyl-3-methyl-imidazolium bromide, Ethylammonium nitrate, Trihexyltetradecylphosphonium decanoate, and Triisobutylmethylphosphonium tosylate. Further ionic liquids suitable for these embodiments include 1-Butyl-1-methylpyrrolidinium bis(trifluoromethylsulfonyl)imide, 1-Ethyl-3-methylimidazolium chloride, 1-Ethyl-3-methylimidazolium trifluoromethanesulfonate, 1-Butyl-3-methylimidazolium trifluoromethanesulfonate, 1-Ethyl-3-methylimidazolium chloride, 1-Ethyl-3-methylimidazolium chloride, 1-Ethyl-3-methylimidazolium bromide, 1-Butyl-3-methylimidazolium chloride, 1-Butyl-3-methylimidazolium bromide, 1-Hexyl-3-methylimidazolium chloride, 1-Hexyl-3-methylimidazolium bromide, 1-Methyl-3-octylimidazolium chloride, 1-Methyl-3-octylimidazolium bromide, 1-Propyl-3-methylimidazolium iodide, 1-Butyl-2,3-dimethylimidazolium chloride, 1-Ethyl-3-methylimidazolium tetrafluoroborate, 1-Ethyl-3-methylimidazolium hexafluorophosphate, 1-Ethyl-3-methylimidazolium dicyanamide, 1-Ethyl-3-methylimidazolium trifluoromethanesulfonate, 1-Ethyl-3-methylimidazolium methanesulfonate, 1-Butyl-3-methylimidazolium tetrafluoroborate, 1-Butyl-3-methylimidazolium hexafluorophosphate, 1-Butyl-3-methylimidazolium hexafluorophosphate, 1-Butyl-3-methylimidazolium trifluoromethanesulfonate, 1-Butyl-3-methylimidazolium methanesulfonate, 1-Hexyl-3-methylimidazolium tetrafluoroborate, 1-Hexyl-3-methylimidazolium hexafluorophosphate, 1-Methyl-3-octylimidazolium tetrafluoroborate, 1-Methyl-3-octylimidazolium hexafluorophosphate, 1-Butyl-2,3-dimethylimidazolium tetrafluoroborate, 1-Butyl-2,3-dimethylimidazolium hexafluorophosphate, Cyclohexyltrimethylammonium bis(trifluoromethylsulfonyl)imide, bis (trifluoromethylsulfonyl)imide, ECOENG™ 418, (2-Hydroxyethyl)trimethylammonium dimethylphosphate, 1-Ethyl-3-methylimidazolium tosylate, ECOENG™ 41M, ECOENG™ 21M, 1-Butyl-4-methylpyridinium bromide, 1-Butyl-3-methylpyridinium tetrafluoroborate, 1-Butyl-4-methylpyridinium tetrafluoroborate, 1-Butyl-4-methylpyridinium hexafluorophosphate, 1-Butyl-3-methylpyridinium hexafluorophosphate, 1-Ethyl-3-hydroxymethylpyridinium ethylsulfate, 1-Ethyl-3-methylpyridinium ethylsulfate, 1-Ethyl-3-methylpyridinium nonaflate, 1-Butyl-3-methylpyridinium dicyanamide, 1-Methyl-3-octylpyridinium tetrafluoroborate, Triethylsulfonium bis(trifluoromethylsulfonyl)imide, Butylmethylpyrrolidinium bis(trifluoromethylsulfonyl)imide, ECOENG™ 411, ECOENG™ 212, and ECOENG™. Preferable ionic solids include, but are not restricted to lithium perchlorate, lithium chloride, sodium chloride, lithium nitrate, sodium nitrate, lithium bromide, sodium bromide, potassium chloride, potassium bromide, lithium bistrifluorosulfonimide, lithium triflouromethanesulfonate, lithium tetrafluoroborate, tetramethylammonium tetrafluoroborate and lithium hexafluorophosphate.

C. Security Applications

The display devices described in FIGS. 3-16A-D can be used in a variety of security applications. These applications are made possible by incorporating key materials used to security applications into the opacifier, passivator, and/or chromic layers of the working electrode structure. The displays using the electrode designs enabled by this invention are manufactured using techniques akin to those used to print secure documents and financial instruments.

Valuable and genuine items such as financial instruments, credit cards, passports, tickets, banknotes, identification cards and branded articles need to be produced in a manner that allows the genuine item to be reliably authenticated. The authentication is accomplished through the inclusion of overt and covert features.

Overt features are designed to be recognizable to the public and difficult for counterfeiters to simulate. They are authenticated visually by the human eye. Patterning and sub-patterning of the chromic layer and inclusion of multiple coloring compounds in the chromic layer can be used to create such designs. By applying power (or waving it at RFID reader) a specific image can be made to appear. Holography is a technique that allows the light scattered from an object to be recorded and later reconstructed so that it appears as if the object is in the same position relative to the recording medium as it was when recorded. The image changes as the position and orientation of the viewing system changes in exactly the same way as if the object were still present, thus making the recorded image appear three-dimensional. Holographic material include dichromated gelatin, photopolymers which can be incorporated inside of the display, preferably as part of the opacifier. Color-shifting inks (such as those offered by Brady Corporation or International Ink Company LLC or SICPA) can change color when viewed at different angles which allow for easy authentication at a glance. These materials can be mixed in the formulations of opacifier, passivator, and chromic layer of the working electrodes described herein.

Covert features are designed to help field investigators determine the authenticity of a document or product with a high degree of certainty using a machine. These features are generally unknown to the public and require the use of a specific device (magnifiers, special lighting and/or specialized readers) and some degree of training to validate. Materials that can used for type of solutions include common pigments used in phosphorescent materials include zinc sulfide, strontium aluminate, strontium oxide aluminate. Common pigments used in fluorescent materials can also be used. These include divalent manganese, hexavalent uranium, trivalent chromium, divalent europium, calcium molybdate, 4-methylmorpholine-N-oxide. IR taggants, materials that deliver a particular signal when activated by a reader, offer a covert authentication method. Many of such materials are listed in PCT/US2005/020997. Structural taggants such as offered by JDSU are printable micro-structured taggants or micro-flakes that are customized with logo or graphics. These materials can be mixed in the formulations of opacifier, passivator, and chromic layer of the working electrodes described herein. This technique is effectively effective inside the chromic layer as the patterns of taggants will vary based on the amount of charge.

Forensic security features are designed for advanced examination and at times requires destruction of the device. An important class of forensic solutions relies on the assignment of a unique secret between two parties. Unlike secrecy that relies on complexity of design (or computation), if the secret can never be reproduced, then the system is unbreakable. Mottling of the surface, for example, occurs during printing of opacifier, separator and chromic layer. Capturing the mottling or other visual characteristics (including spectroscopic information) at the end of the manufacturing process can be used as that secret. That secret can be stored into a database that will form the foundation for forensic verification. The display devices described herein can be used as forensic security devices wherein the optical or spectral of selected areas of the display are collected at different levels of coloring and stored in a database for future comparison.

Terminology Used Herein

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and other parameters used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

All numerical ranges herein include all numerical values and ranges of all numerical values within the recited numerical ranges. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The various embodiments and examples of the present invention as presented herein are each understood to be non-limiting with respect to the scope of the invention. This is especially true with respect to the location of the structural substrate and overlap nature of the layers. Nothing precludes the substrate to be located in the back of the display or in the middle of the display (if slotted or porous). This is also true of the location of the "counter" electrode (charge reservoir). The various embodiment focus on the "working" or coloring electrode of electrochromic displays rather than the "counter" electrode. Nothing precludes the counter electrode nor separator from also including a color layer inside it.

The embodiments are described in terms of an electrochromic displays. Other chromic systems can leverage the same three-dimensional electrodes.

The various embodiments describe the operation of the coloring of chromogen molecules providing a reversible process. Certain materials provide irreversible changes when upon colored once the chromogen remains colored after the charge has been removed or (re-added in the case). This functionality is claimed as part of this invention.

The embodiments describe the injection of charges to the display through wires. Other means of connection through printed conductors on substrate, PCB, transistors, transistor circuit, integrated circuits, active matrix can be used to transport charges.

The terms "on", "appended to", "affixed to", "printed into", "bonded to", "adhered to", or terms of like import means that the designated item, e.g., a coating, film or layer, is either directly connected to (superimposed directly on) the object surface, or indirectly connected to the object surface, e.g., through one or more other coatings, films or layers.

"Insulation Layer" and "Isolator Layer" are used interchangeably.

An "opacifier layer" is passivator layer whose primary function is to provide color rather than insulation.

The terms "chromogenic layer", "coloring layer", "chromic layer", and "electrochromic layer" are used interchangeably.

The terms "chromogen," "viologen" and "coloring compounds" are used interchangeably.

The terms "cathodic" and "reductive" are used interchangeably.

The term's "anodic" and "oxidative" are used interchangeably.

The word "segment" as used to describe the image being displayed can be replaced by "area," "pixel," "icon" or any other individually addressable element on a display.

The term "rigid", as used for example in connection with a substrate, means that the specified item is self-supporting, i.e. capable of maintaining its shape and supporting any subsequently applied layers, for example, as may be applied through printing processes. This substrate can be placed in the front of the display and/or the back of the display, and/of (when porous or hollowed) in the middle of the display.

The term "transparent", as used for example in connection with a substrate, film, material, layer and/or coating, means that the indicated substrate, coating, film, layer and/or material has the property of transmitting light without appreciable scattering so that objects lying beyond are entirely visible. In printed electronics and displays, "transparent conductors" are only substantially transparent and may reduce brightness by as much as 20%.

The phrase "partially covering" means an amount of a structure covering at least a portion, up to the complete surface of another structure.

The phrase "substantially covering" means an amount of a structure A covering at least a portion up to the complete surface of another structure B or structure B covering at least a portion up to the complete surface of the structure B.

A "film" may be formed by a sheeting type of material or a coating type of material. For example, a film may be a set of polymeric sheets or a polymeric coating of another material.

What is claimed:

1. A display device forming an image and having a viewer side and a back side, said display comprising:
    a transparent layer positioned at the viewer side of the display, wherein transparent layer has a top surface and a bottom surface;
    a coloring electrode positioned on the transparent layer bottom surface;
    said coloring electrode comprises a connected conductor system formed from one or more heterogeneous conductive layers, a coloring layer, with the proviso that the heterogeneous conductive layers are not positioned between the transparent layer bottom surface and the coloring layer;
    wherein said conductor heterogeneity comprises variations in one or more of: conductor material composition; conductor layer dimension; conductor layer pattern; conductor layer grid design, and combinations thereof; and
    a second electrode;
    a separator layer positioned between the coloring electrode and the second electrode;
    an electrolyte permeating throughout the display device;
    a back layer positioned at the back side of the display;
    a passivator layer; and,
    an opacifier layer,
    wherein each passivator layer and opacifier layer is ionically isolative and electronically isolative,
    wherein the opacifier layer is located beneath the transparent layer bottom surface and above one or more of the heterogeneous conductor layers, and
    wherein the passivator layer is located beneath one or more of the heterogeneous conductor layers and above the separator layer.

2. The display device according to claim 1, wherein said coloring electrode has electrical conduction in a lateral direction and ionic conduction in a transversal direction.

3. The display device according to claim 2, wherein the heterogeneous conductor layers are non-transparent.

4. The display according to claim 1, wherein each passivator layer and opacifier layer has a property selected from: transparent, translucent or opaque.

5. The display according to claim 4, wherein each passivator layer and opacifier layer contains material selected from the group consisting of: reflective material, light scattering material, fluorescent material, phosphorescent material and combinations thereof.

6. The display of according to claim 5, wherein said opacifier layer has a shape corresponding to a negative shape of the image.

7. The display according to claim 6, wherein said coloring layer contains at least one coloring composition which generates an on-color image, wherein each opacifier layer contains a material which generates negative color image, and wherein the on-color image and the negative color image are a color match.

8. The display according to claim 6, wherein said coloring layer contains at least one coloring composition which generates an on-color image, wherein each opacifier layer contains a material which generates a negative color image, and wherein the on-color image and the negative color image are a color match.

9. The display according to claim 7 or claim 8, wherein reduction of the coloring composition causes the coloring layer to display the on color image.

10. The display according to claim 7 or claim 8, wherein oxidation of the coloring composition causes the coloring layer to display the on color image.

11. The display according to claim 10, wherein a single coloring layer has two or more individually addressable segments, wherein each individually addressable segment is connected to an independent heterogeneous conductor layer, and said single coloring layer has an external shape corresponding to a positive shape of the image.

12. The display according to claim 11, wherein each independent heterogeneous conductor layer is connected to an independent conductor track.

13. The display according to claim 10, wherein a first coloring layer is located above a single heterogeneous conductor layer.

14. The display according to claim 13, wherein the single heterogeneous conductor layer is connected to a conductor track at a charge injection point comprising one or more of the following: lateral edge conductor charge injection point, transverse edge conductor charge injection point and mid-conductor layer charge injection point.

15. The display according to claim 10, wherein the passivator layer is located beneath one or more of the heterogeneous conductor layers and above the separator layer, wherein a first portion of the passivator has a shape corresponding to a negative shape of the image, and wherein a second portion of the passivator layer is located below the coloring layer.

16. The display according to claim 15, wherein one or more passivator layers are subpatterned.

17. The display according to claim 15, wherein one or more passivator layers incorporates a taggant or security identifier.

18. The display according to claim 1, wherein the coloring layer comprises two or more pixels, wherein each pixel is connected a single heterogeneous conductor layer, wherein the single heterogeneous conductor layer is connected to a single conductor track at a charge injection point comprising one or more of the following: lateral edge conductor charge injection point, transverse edge conductor charge injection point, active matrix, via, and mid-conductor layer charge injection point.

19. The display according to claim 10, further comprising one or more charge injection points co-located with one or more coloring layers.

20. The display according to claim 10, with the proviso that the one or more charge injection points are not located on a lateral side of said display.

21. The display according to claim 20, wherein the coloring layer contains one or more redox active materials, said redox active materials being selected from the group consisting of: a first redox active material that generates color upon reduction, a second redox active material that generates color upon oxidation and combinations thereof.

22. The display according to claim 20, wherein the coloring layer contains a coloring composition comprising one or more of the following compounds: 1-(3-Phenylpropyl)-1'-(2-phosphonoethyl)-4,4'-bipyridinium dichloride; 1-(3-Phenylpropyl)-1'-(2-phosphonoethyl)-4,4'-bipyridinium bis-hexafluorophosphate; 1-(2-Phosphonoethyl)-1'-(2,4,6-trimethylphenyl)-4,4'-bipyridinium dichloride; 1-(2-Phosphonoethyl)-1'-(2,4,6-trimethylphenyl)-4,4'-bipyridinium bis(hexafluorophosphate); 1-(1-Naphtalenyl)-1'-(2-phosphonoethyl)-4,4'-bipyridinium dichloride; 1-(4-Cyano-1-naphtalenyl)-1'-(2-phosphonoethyl)-4,4'-bipyridinium dichloride; 1-(4-Methylphenyl)-1'-(2-phosphonoethyl)-4,4'-bipyridinium dichloride; 1-(4-Cyanophenyl)-1'-(2-phosphonoethyl)-4,4'-bipyridinium dichloride; 1-(4-Fluorophenyl)-1'-(2-phosphonoethyl)-4,4'-bipyridinium dichloride; 1-(4-Phenoxyphenyl)-1'-(2-phosphonoethyl)-4,4'-bipyridinium dichloride; 1-(4-t-Butylphenyl)-1'-(2-phosphonoethyl)-4,4'-bipyridinium dichloride; 1-(2,6-Dimethylphenyl)-1'-(2-phosphonoethyl)-4,4'-bipyridinium dichloride; 1-(3,5-Dimethylphenyl)-1'-(2-phosphonoethyl)-4,4'-bipyridinium dichloride; 1-(4-Benzoylphenyl)-1'-(2-phosphonoethyl)-4,4'-bipyridinium dichloride; 1-(3-phenylpropyl)-1'-(phosphonomethylphenyl)-4,4'-bipyridinium dichloride; 1-(3-phenylpropyl)-1'-(phosphonomethylphenyl)-4,4'-bipyridinium bis(hexafluorophosphate); 1-(2-Phosphonoethyl)-1'-(phosphonomethylphenyl)-4,4'-bipyridinium dichloride; 1-(2,4-Dinitrophenyl)-1'-(phosphonomethylphenyl)-4,4'-bipyridinium dichloride; 1-(2,4-Dinitrophenyl)-1'-(phosphonomethylphenyl)-4,4'-bipyridinium bis(hexafluorophosphate); 1-(4-Phenoxyphenyl)-1'-(phosphonomethylphenyl)-4,4'-bipyridinium dichloride; 1-(4-Phenoxyphenyl)-1'-(phosphonomethylphenyl)-4,4'-bipyridinium bis(hexafluorophosphate); 1-(4-Fluorophenyl)-1'-(phosphonomethylphenyl)-4,4'-bipyridinium dichloride; 1-(4-Methylphenyl)-1'-(phosphonomethylphenyl)-4,4'-bipyridinium dichloride; 1-Phosphonomethylphenyl-1'-(2,4,6-trimethylphenyl)-4,4'-bipyridinium dichloride; 1-Benzyl-1'-(phosphonomethylphenyl)-4,4'-bipyridinium dichloride; 1-(1-Naphthenyl)-1'-(phosphonomethylphenyl)-4,4'-bipyridinium dichloride; 1-(Phenyl)-1'-(phosphonomethylphenyl)-4,4'-bipyridinium dichloride; 1-(4-Cyanophenyl)-1'-(phosphonomethylphenyl)-4,4'-bipyridinium dichloride; 1-(4-Benzoylphenyl)-1'-(phosphonomethylphenyl)-4,4'-bipyridinium dichloride; 1-[4-(1-Cyanonaphythenyl)]-1'-(phosphonomethylphenyl)-4,4'-bipyridinium dichloride; 1-(2,6-Dimethylphenyl)-1'-(phosphonomethylphenyl)-4,4'-bipyridinium dichloride; 1-(3,5-Dimethylphenyl)-1'-(phosphonomethylphenyl)-4,4'-bipyridinium dichloride; 1-(2-Phosphonoethyl)-1'-(2,4,6-trimethylphenyl)-4,4'-bipyridinium bis[bis(trifluoromethanesulfonimide)]; and a compound according to a formula:

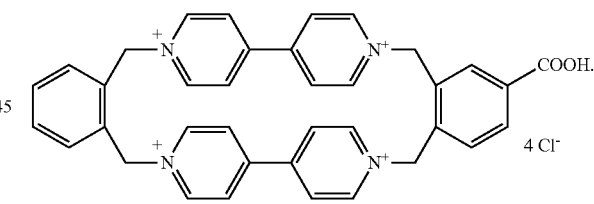

23. The display according to claim 20, wherein the coloring layer contains a coloring composition having a first $E_{1/2}$ reduction potential ranging from −0.37 to −0.65 volts.

24. The display according to claim 20, wherein the coloring layer contains a coloring composition having a first $E_{1/2}$ oxidation potential ranging from 0.8 to 1.2 volts.

25. The display according to claim 10, with the proviso that one or more heterogeneous conductor layers realizing one or more diode or transistors.

26. The display according to claim 1, where an optical property or spectral property of selected areas of the display are collected at different levels of coloring and stored in a database for future comparison.

* * * * *